US007949961B2

(12) United States Patent
Stevenson et al.

(10) Patent No.: US 7,949,961 B2
(45) Date of Patent: May 24, 2011

(54) USER INTERFACE FOR PERFORMING LOAD ANALYSIS

(75) Inventors: Scott W. Stevenson, Webster Groves, MO (US); Dean H. Wette, St. Louis, MO (US); Bruce Shimel, Dardenne Prairie, MO (US)

(73) Assignee: The Boeing Company, Chicago, IL (US)

( * ) Notice: Subject to any disclaimer, the term of this patent is extended or adjusted under 35 U.S.C. 154(b) by 437 days.

(21) Appl. No.: 11/552,402

(22) Filed: Oct. 24, 2006

(65) Prior Publication Data
US 2008/0115052 A1    May 15, 2008

(51) Int. Cl.
    G06F 17/20    (2006.01)
(52) U.S. Cl. ........ 715/841; 715/243; 715/848; 715/964; 715/769
(58) Field of Classification Search .................. 715/243, 715/848, 841, 769, 964
    See application file for complete search history.

(56) References Cited

U.S. PATENT DOCUMENTS

| 6,782,346 B2* | 8/2004 | Bond et al. ..................... 702/183 |
| 2004/0002796 A1* | 1/2004 | Shimel .............................. 701/3 |
| 2007/0150562 A1* | 6/2007 | Stull et al. ..................... 709/223 |

OTHER PUBLICATIONS

Top Systems, T-FLEX Analysis, Aug. 28, 2006, http://www.tflex.com/products/analysis.htm.*
Dolphins Software, Circuit Load Analysis, Dec. 11, 2004, http://dolphins-software.com/circuitLoad.htm.*
CSIR, Pavement Analysis and Design Software, Oct. 30, 2003, http://asphalt.csir.co.za/samdm/.*
Symbian Wave 'Magic Text Software', Feb. 20, 2006, http://symbianwave.com.*
Enzmann et al., "Ray Tracing Worlds with POV-RAY", 1994, The Waite Group, Inc., (pp. 20-21, 29, 56, 111, 369, 375, 377, 380, 381, 387, 389, 393, 395, and 397).*
Delaware County Community College, "Basic Elements of Internet Explorer: The Internet Explorer Interface", Apr. 28, 2004, http://www.dccc.edu/tutorials/ie/interface.htm.*

* cited by examiner

*Primary Examiner* — Kieu Vu
*Assistant Examiner* — Andrea Leggett
(74) *Attorney, Agent, or Firm* — Harness, Dickey & Pierce, P.L.C.

(57) ABSTRACT

A user interface for performing load analysis on various geometries is provided. The user interface is especially useful for performing load analysis operations on mobile platforms, for example an aircraft. The user interface includes an object display that lists a plurality of load objects that include object data. A plurality of menu displays list a plurality of load operations. A data display displays the object data associated with the plurality of load objects.

14 Claims, 37 Drawing Sheets

FIGURE 14

LeftWing

Total Load

| Axis Name | Fx<br>lbf | Fy<br>lbf | Fz<br>lbf | Mx<br>in·lbf | My<br>in·lbf | Mz<br>in·lbf |
|---|---|---|---|---|---|---|
| Engineering Name | | | | | | |
| THS Name | | | | | | |
| Sign Factor | | | | | | |
| Is Target Active? | | | | | | |
| Starting Value | | | | | | |
| Target Value | | | | | | |
| Ending Value | | | | | | |

Local Coordinate System Definition

| | X | Y | Z |
|---|---|---|---|
| Origin | | | |
| X Axis Orientation | | | |
| Y Axis Orientation | | | |
| Z Axis Orientation | | | |

*FIGURE 15c*

```
PointMass constructor is PointMass(wt, x,y,z, Ixx,Iyy,Izz, Ixy,Iyz,Ixz)
(Must shift the cross product order provided by weights in .xls files.)
*/ globalCS = new CoordSys();
pz = new Vectorg(0,0,1);
nz = new Vectorg(0,0,-1);

// Create the Applied Load Set
//----------------------------
appliedLoadsSet = new AppliedLoadsSet();

- areaRef :: 1.0
- coordSys :: CoordSys
- description :: Global LRA
- fxAlias :: Fx
- fxScale :: 1.0
- fyAlias :: Fy
- fyScale :: 1.0
- fzAlias :: Fz
- fzScale :: 1.0
- mxAlias :: Mx
- mxScale :: 1.0
- myAlias :: My
- myScale :: 1.0
- mzAlias :: Mz
- mzScale :: 1.0
- XRef :: 1.0
- YRef :: 1.0
- ZRef :: 1.0

Create LRA (description, coordSys, alias...

Function Inputs

| Input Name | Type | Value | | Action |
|---|---|---|---|---|
| description | String | | > | None |
| cs | CoordSys | | > | New... |
| fxAlias | String | | > | None |
| fyAlias | String | | > | None |
| fzAlias | String | | > | None |
| mxAlias | String | | > | None |
| myAlias | String | | > | None |
| mzAlias | String | | > | None |

Function Output
Result Name

Execute | Execute and Close | Cancel | Help

USER INTERFACE FOR PERFORMING LOAD ANALYSIS

FIELD

The present disclosure relates to computer systems and more particularly to computer systems and methods for performing load analysis.

BACKGROUND

The statements in this section merely provide background information related to the present disclosure and may not constitute prior art.

Structural loads are forces applied to a component of a structure or to the structure. Loads cause stress, deformations and displacements in the structures. Assessment of the effects of varying loads is carried out by the methods of load analysis. Load analysis may be performed on any structure subject to varying load conditions.

For example, load analysis of an aircraft is generally performed early and throughout the design cycle of the aircraft. Load data can be generated based on varying flight conditions. The analysis of the data is used to enhance the overall structural design of the aircraft. Typically, the load data can be generated from a variety of sources including Computational Fluid Dynamics (CFD), wind tunnel, and flight tests. Each source may provide the data in different formats. Different analysis operations may be performed on the data from each source. A variety of tools provide the capability to process the data from a single source according to a subset of analysis operations. Thus, multiple tools are necessary to perform load analysis throughout the design cycle. Using multiple tools provides for inefficiencies in the design process as well as can be costly to maintain. A single tool that combines the varied data and can perform multiple load analysis operations that can be used throughout the design cycle is yet to be provided.

SUMMARY

In one embodiment, a user interface for performing load analysis on various geometries is provided. The user interface includes an object display that lists a plurality of load objects that include object data. A plurality of menu displays list a plurality of load operations. A data display displays the object data associated with the plurality of load objects.

In another embodiment, a system for managing a load analysis user interface is provided. In this embodiment the system includes an object display module that generates an object display. The object display lists a plurality of load objects. A menu manager module generates a plurality of menu displays. Each menu display lists a plurality of load operations. A data display module generates a data display that displays object data associated with the plurality of load objects.

In various embodiments, the systems and methods are especially suited for performing load analysis on various mobile platforms. In one embodiment, the mobile platforms can be military or commercial aircrafts.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 14 is an exemplary illustration of a view configuration display.

FIGS. 15a-15c are exemplary illustrations of data displays.

FIG. 16a-16b are exemplary illustrations of script displays.

FIG. 23 is an exemplary illustration of a Load Reference Axis (LRA) dialog box.

FIG. 24 is an exemplary illustration of an LRA object within an object display.

DETAILED DESCRIPTION

Figure 1:
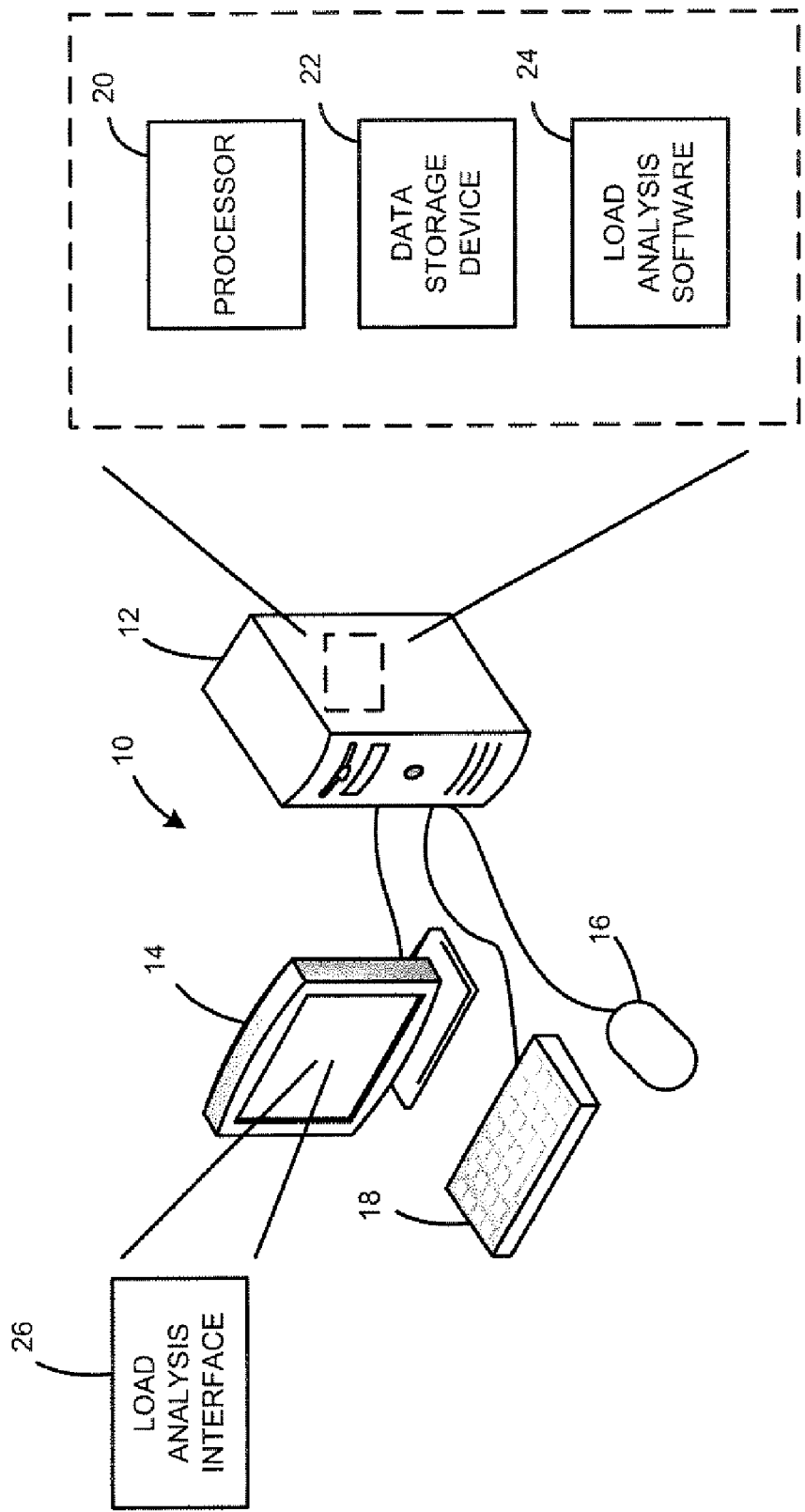
FIG. 1 is an illustration of a computer system including load analysis software in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, a computer system is shown generally at 10 to include a computer 12 and a display 14. The computer 12 may be any computer system including, but not limited to, a laptop, a desktop, and a workstation. The computer 12 is shown to be associated with one or more input devices 16, 18 used by a user to communicate with the computer 12. As can be appreciated, such devices 16, 18 may include, but are not limited to, a mouse, a keyboard, and a touchpad. The computer 12 includes a processor 20 and one or more data storage devices 22. The one or more data storage devices 22 can be at least one of random access memory (RAM), read only memory (ROM), a cache, a stack, or the like which may temporarily or permanently store electronic data of the computer 12. The processor 20 of the computer 12 is operable to execute one or more set of instructions contained in software. Load analysis software 24 in accordance with the present disclosure can be installed to the computer 12 or run by the computer 12 from a portable storage device such as a CD-ROM (not shown). In various other embodiments, the load analysis software 24 can be downloaded via the internet (not shown) or run from a remote location such as from a remote server (not shown).

The load analysis software 24 may be used by a user to perform various load analysis operations based on data stored in the data storage device 22. In various embodiments, the data may be stored according to various formats including, but not limited to, ASCII (American Standard Code for Information Interchange), binary, Nastran, Panair, Patran Neutral, and CGD (Codeless Generic Dialog). The load analysis software 24 can perform load analysis operations in any order dictated by a user. A user may communicate with the load analysis software 24 via at least one load analysis user interface 26 displayed by the display 14.

Figure 2:
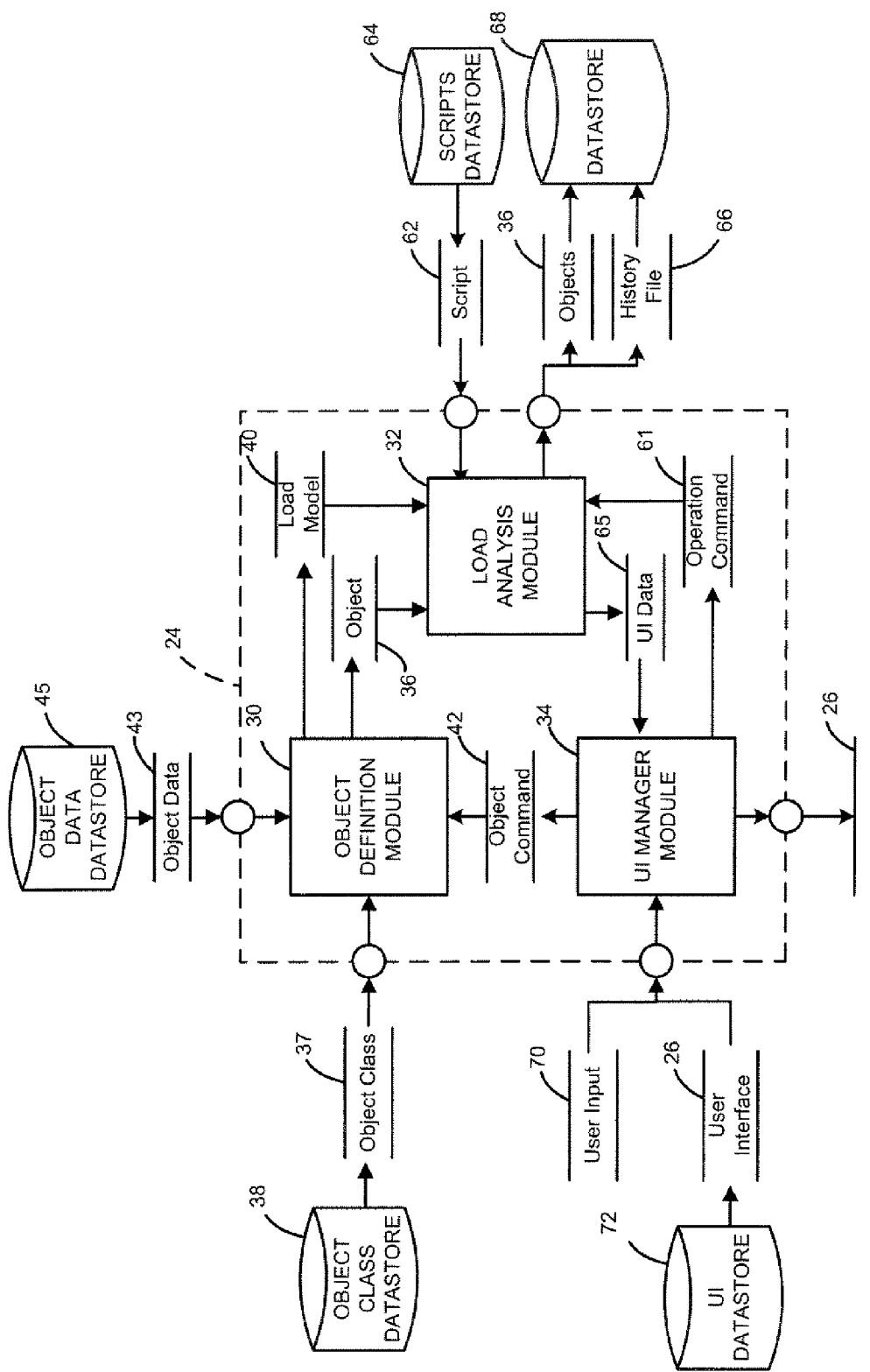
FIG. 2 is a dataflow diagram illustrating exemplary modules of the load analysis software.

Referring to FIG. 2, an exemplary embodiment of load analysis software 24 includes one or more software modules. As can be appreciated, the software modules shown in FIG. 2 may be combined and/or further partitioned to similarly perform load analysis operations. In the embodiment of FIG. 2, the load analysis software 24 includes an object definition module 30, a load analysis module 32, and a user interface (UI) manager module 34. Inputs to the load analysis software 24 can be received from user input devices 16, 18 (FIG. 1) and/or retrieved from the data storage device 22 of the computer 12 (FIG. 1). In the exemplary embodiment, the load analysis software 24 is implemented according to an object-oriented approach using predefined class definitions that define load objects and corresponding operations. As can be appreciated, the load analysis software 24 can similarly be implemented according to other software programming methods. For ease of the discussion, the disclosure will be discussed in the context of an object-oriented implementation.

The object definition module 30 generates load objects 36 based on predefined object class definitions 37 retrieved from an object class datastore 38. Each object 36 can be associated with one or more load models 40. The load model 40 can also be generated based on predefined object class definitions 37. The particular type of load object 36 or load model 40 to be generated is determined based on an object command 42 received from the UI manager module 34. Based on the type of the load object 36, the object definition module 30 associates object data 43 from an object data datastore 45 with the load object 36.

Figure 3:
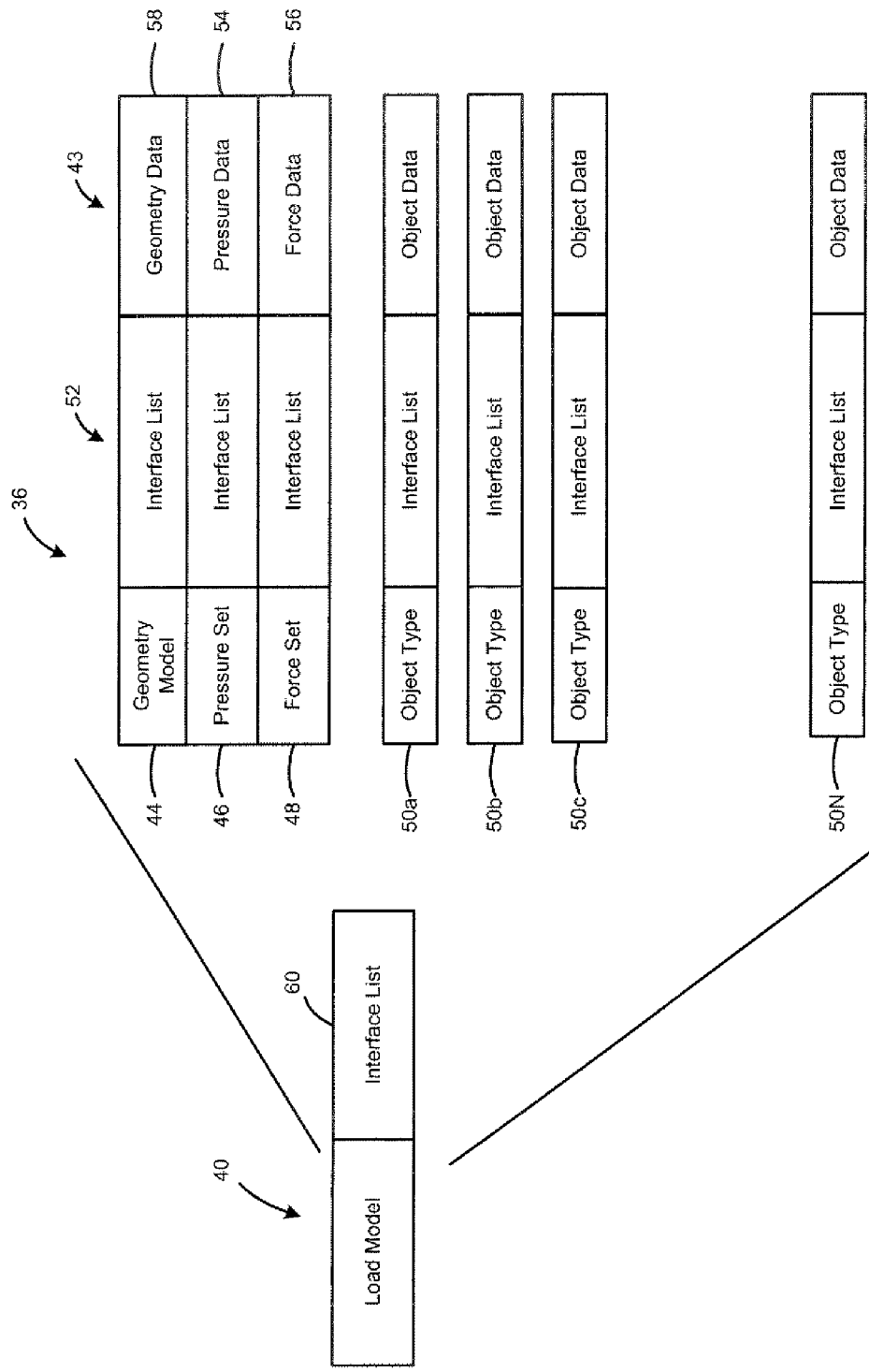
FIG. 3 is a block diagram illustrating exemplary objects created by the load analysis software.

As shown in FIG. 3, an exemplary load model 40 and a number of exemplary load objects 36 are shown. The load model 40 is associated with at least one geometry model object 44, one pressure set object 46, and one force set object 48. The load model 40 may further be associated with one or more analysis objects 50a-50N. The geometry model object 44 includes geometry data 58 that defines the load model geometry. The geometry data 58 includes a plurality of data points or nodes or groups of data points or nodes and their relationship to one another. The pressure set object 46 includes pressure data 54 for each data point or node of the model geometry. The force set object 48 includes force data 56 including force vectors stored for each data point or node of the model geometry. As can be appreciated, each load model 40 may include one or more pressure set objects 46 and force set objects 48, each relating to a different pressure scenario. For example, in the context of load analysis for an aircraft, each set relates to a different flight condition.

In addition to the object data 43, each load object 36 includes one or more predefined interfaces 52 that correspond to operations that can be performed on the object data 43. For example, interfaces 52 corresponding to the following operations including, but not limited to, addition, subtraction, multiplication, size of, min value, max value, plus a constant, floor, and ceiling may be performed on the pressure data 54 of the pressure set object 46. Interfaces corresponding to operations including, but not limited to, addition, subtraction, multiplication, size of, min value, max value, plus a constant, floor, and ceiling may be performed on the force data 56 of the force set object 48. Similarly, the load model 40 includes one or more predefined interfaces 60 that correspond to operations that can be performed on the objects 44-48 and 50a-50N of the load model 40. For example, interfaces corresponding to the operations include, but are not limited to: apply geometric transform; get and set geometry models; pressure sets; and load sets; remove stray pressures and forces; report data; and merge with other loads models. Details of the operations will be discussed in more detail below.

Referring back to FIG. 2, the load analysis module 32 performs load analysis operations on the load objects 36 and the load models 40. The type of operation performed is based on an operation command 61 received from the UI manager module 34. The load analysis module 32 performs the operation as designated by the operation command 61 via the predefined interface 52 associated with the object 36. The interface 52 executes the instructions in a predefined script 62 stored in a script datastore 64. The load analysis module 32 stores the objects 36 and a history file 66 including a history of each script executed in a datastore 68. The history file 66 and/or the objects 36 may be later retrieved and executed to replicate the analysis operations on the current data or different data.

The UI manager module 34 receives as input at least one user interface 26 and user input 70. The user interface 26 can be predefined and stored in a user interface datastore 72. The UI manager module 34 loads and displays the appropriate user interface 26 and user interface data 65, received from the load analysis module 32 based on the user input 70. The user interface data 65 will vary based on the operation performed by the load analysis module 32. Details of the user interface 26 will be discussed further below. The UI manager module 34 generates at least one of the object command 42 and the operation command 61 based on the user input 70. For example, if the user input 70 indicates the user has communicated through the user interface 26 to create a new object, the object command 42 is generated and sent to the object definition module 30. If the user input 70 indicates the user has communicated through the user interface 26 to perform a load analysis operation, the operation command 61 is generated and sent to the load analysis module 32.

Figure 4:
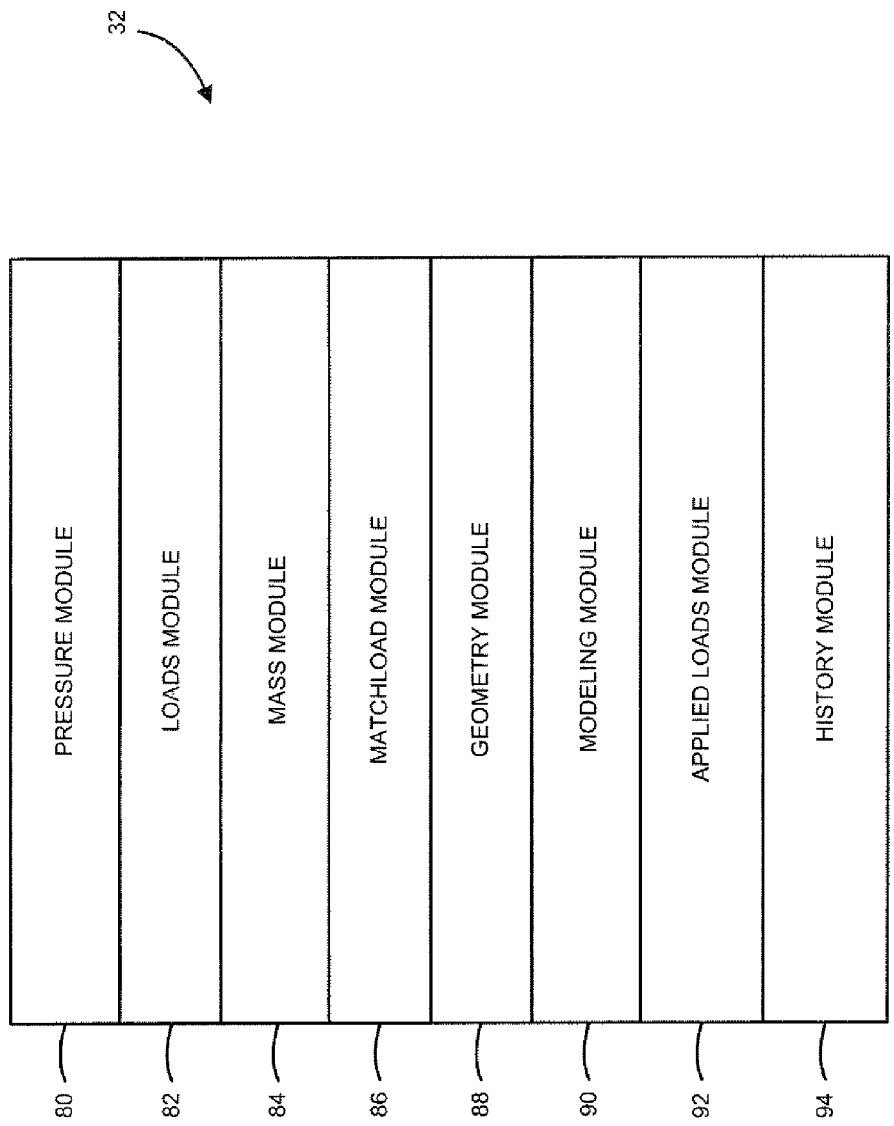
FIG. 4 is a block diagram illustrating exemplary sub-modules of a load analysis module.

Referring to FIG. 4, a block diagram illustrates an exemplary load analysis module 32 in more detail. The load analysis module 32, in the example of FIG. 4, includes a pressure module 80, a mass module 82, a loads module 84, a matchloads module 86, a geometry module 88, a modeling module 90, an applied loads module 92, and a history module 94. Each module retrieves and executes the scripts 62 (FIG. 2) that provide the functionality of one or more operations. As can be appreciated, the modules shown in FIG. 2 may be combined and/or partitioned to similarly perform load analysis operations.

Figure 5:
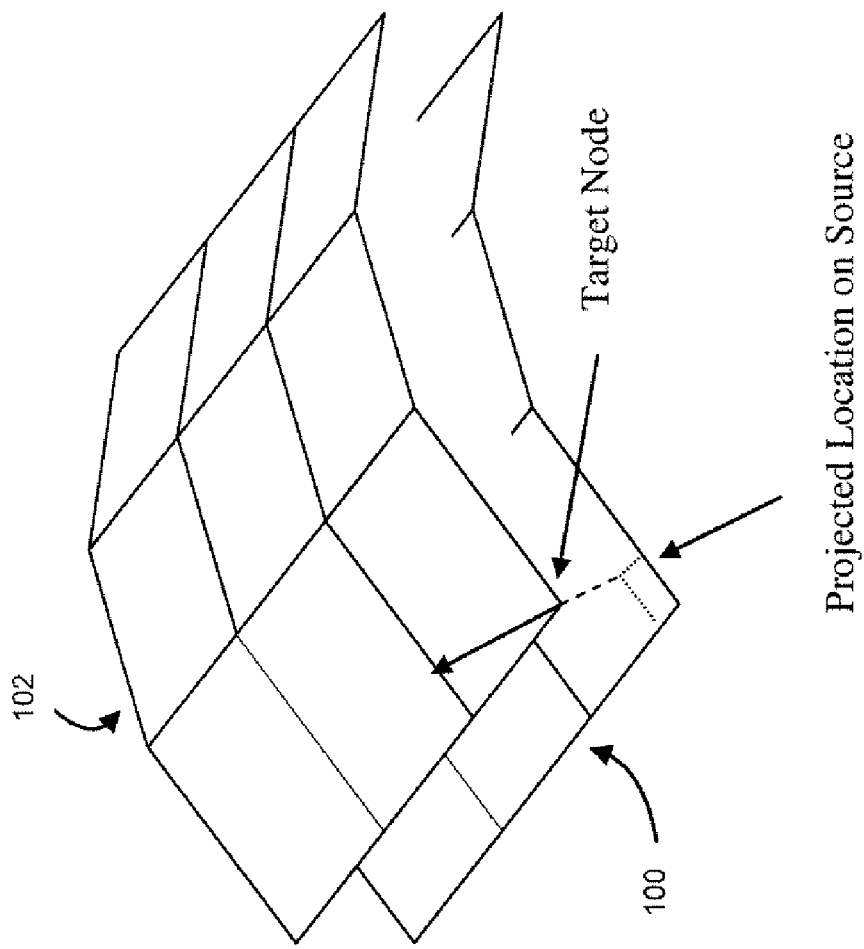
FIG. 5 is an illustration of a pressure mapping method.

The pressure module 80 performs pressure operations on distributed pressure data. The pressure module 80 loads distributed pressure data associated with the geometry; performs mathematical operations on the pressure data; integrates the pressure data into distributed loads; interpolates between pressure distributions; and exports pressure data to a variety of formats. Such formats can be capable of visual display and/or imported to a data spreadsheet. In particular, the pressure module 80 maps distributed pressure data between different geometry models. Pressure mapping is performed by creating a pressure map object. Pressure mapping is performed by a pressure map operation. As shown in FIG. 5, the pressure module 80 (FIG. 4) maps pressure data from a source object 100 to a target object 102 by projecting nodes or points of the target object 102 to a surface of the source object 100 along a normal direction. The pressure module 80 then computes a target pressure using a bi-linear interpolation of pressure values at each projected point of the source object 100.

Referring back to FIG. 4, the loads module 82 performs load analysis operations on load data distributed across the geometry and on load data concentrated at points in the geometry. The loads module 82 loads distributed loads data from a variety of sources and formats; sums distributed loads for all or parts of the geometry model; and exports distributed loads to a variety of formats. The loads module 82 performs mathematical operations for low level concentrated point loads (e.g., addition, subtraction, scaling); provides coordinate transformation of point loads; provides translation of point loads; and provides reporting of point loads in specified coordinate systems. In particular, the loads module 82 maps distributed forces between geometry models. Force mapping is performed by creating a forcemap object. Various operations are associated with the forcemap object that can be used to perform force mapping, including but not limited to, a virtual work operation, a modified virtual work operation, and a smearing operation.

Figure 6:
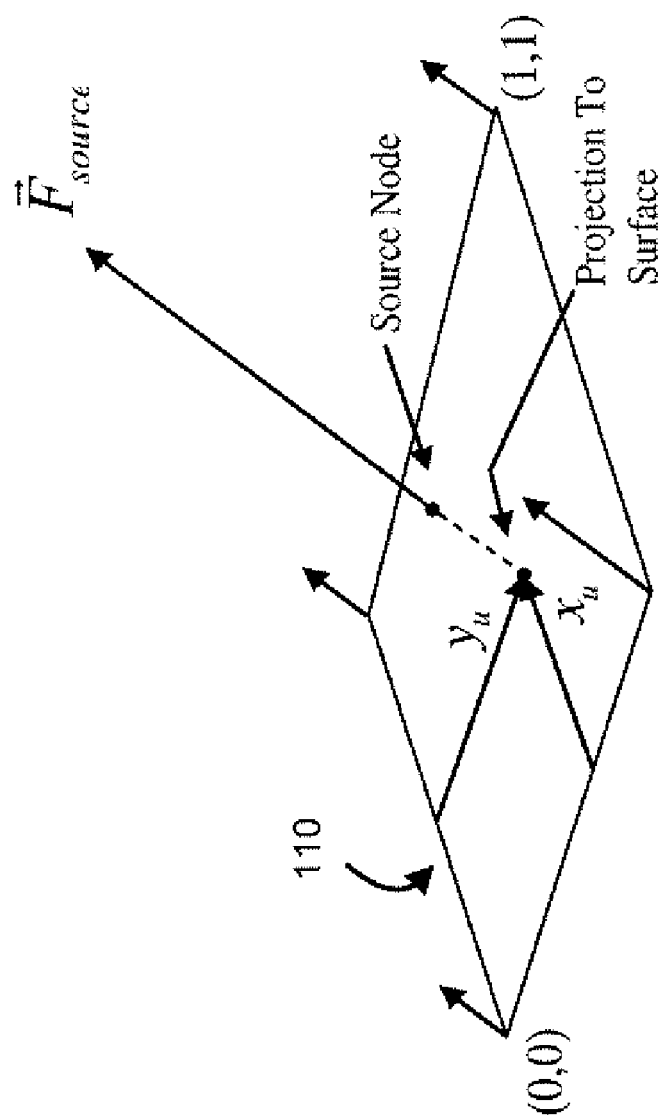
FIG. 6 is an illustration of a first exemplary force mapping method.

The virtual work operation executes a virtual work method. As shown in FIG. 6, the virtual work method maps forces to surface elements. The force $F_{Source}$ is projected to a target surface 110 along a line of force. The force is distributed to nodes ($F_{0,0}$, $F_{1,0}$, $F_{1,1}$, $F_{0,1}$) using virtual work weighting factors.

For example:

$$\vec{F}_{0,0} = \vec{F}_{target} * (1-x_u)(1-y_u) \quad (1)$$

$$\vec{F}_{1,0} = \vec{F}_{target} * (x_u)(1-y_u) \quad (2)$$

$$\vec{F}_{1,1} = \vec{F}_{target} * (x_u)(y_u) \quad (3)$$

$$\vec{F}_{0,1} = \vec{F}_{target} * (1-x_u)(y_u) \quad (4)$$

Figure 7:
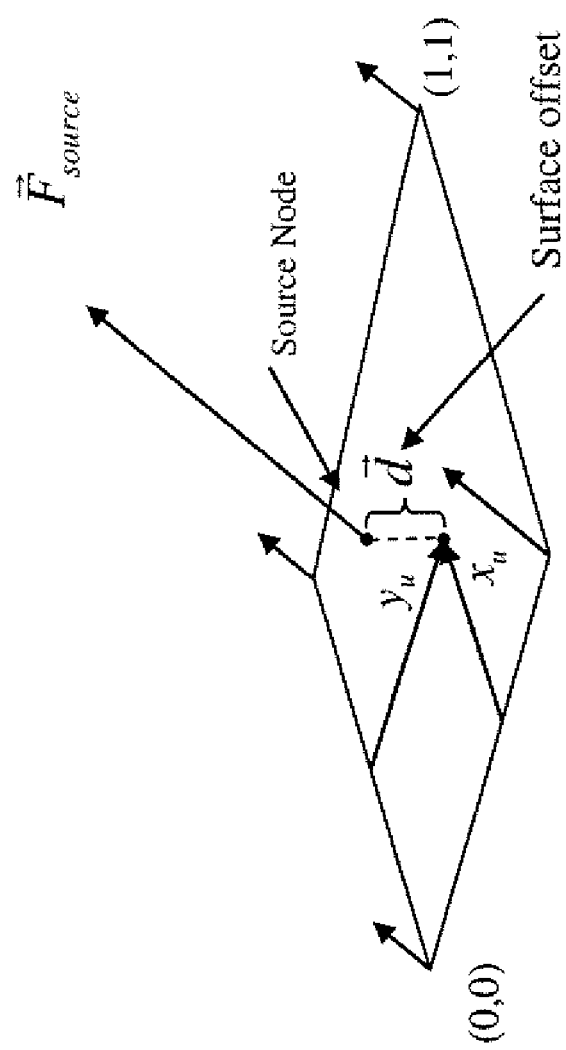
FIG. 7 is an illustration of a second exemplary force mapping method.
Figure 8:
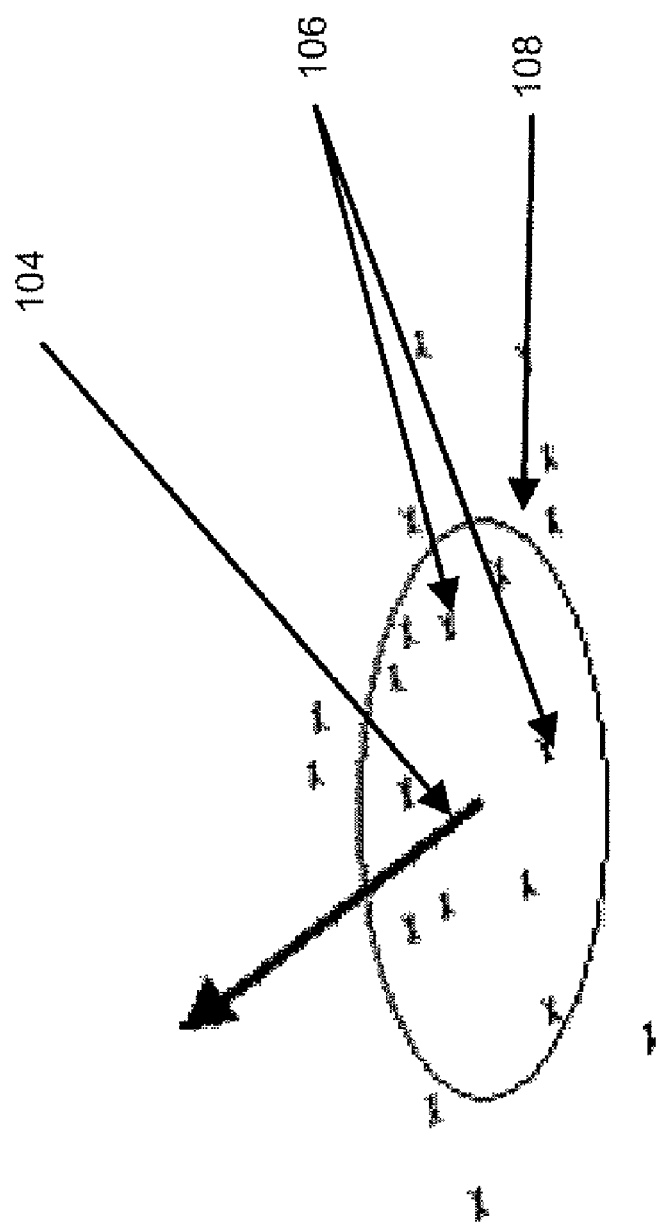
FIG. 8 is an illustration of a third exemplary force mapping method.

The modified virtual work operation executes a modified virtual work method. As shown in FIG. 7, the modified virtual work method projects target nodes to a surface in the direction of the surface normal. The modified virtual work method employs a 3×3 matrix to account for out of plane moments. Moment is spread to target nodes with reaction forces normal to the element. The smear operation executes a smear method. As shown in FIG. 8, the smear method smears forces to a target using n closest nodes.

The smear method preserves force and moment. Each force/node 104 in a source model is mapped to closest n nodes (x) in a target model 106 that fall within a specified spherical radius 105. A pseudo inverse is computed using a singular value a decomposition technique (SVD) shown as:

$$\begin{Bmatrix} f_x \\ f_y \\ f_z \\ m_x \\ m_y \\ m_z \end{Bmatrix}_{source} = A * \begin{Bmatrix} f_{x1} \\ f_{y1} \\ f_{z1} \\ \vdots \\ f_{xn} \\ f_{yn} \\ f_{zn} \end{Bmatrix}_{targets} \begin{Bmatrix} f_{x1} \\ f_{y1} \\ f_{z1} \\ \vdots \\ f_{xn} \\ f_{yn} \\ f_{zn} \end{Bmatrix}_{targets} = A^{-1} \begin{Bmatrix} f_x \\ f_y \\ f_z \\ m_x \\ m_y \\ m_z \end{Bmatrix}_{source} . \quad (5)$$

The SVD technique results in a "minimum norm" solution to the target force.

Referring back to FIG. 4, the mass module 84 performs mass analysis operations on mass data distributed across the geometry model and on mass data concentrated at points in the geometry model. The mass module 84 loads and displays distributed mass data; sums distributed mass data over all or parts of the geometry model; computes inertial loads by accelerating distributed mass by an acceleration state; and exports distributed mass data to various formats. The mass module 84 performs mathematical operations for low level concentrated point mass data (e.g., addition, subtraction, scaling); computes point loads by accelerating point mass items by an acceleration state; coordinates transformation of a point mass; reports point mass data in a specified coordinate system; and imports and exports point mass data.

The matchloads module 86 adjusts distributed pressure loads to match known component target loads and matches simultaneously all target component loads and an overall vehicle load including aerodynamic, inertial, and applied loads. In particular, the matchloads module 86 matches target loads using one of at least two methods. The first method matches the target loads using a linear combination of base pressure distributions. For example, given base pressure distributions $P_1$, $P_2$, $P_n$, a pressure model is provided as:

$$\hat{P}_{final} = \sum_{i=1}^{n} \hat{P}_i * k_i. \quad (6)$$

Where $P_{final}$ is a final pressure distribution, $P_i$ is a base pressure distribution, and $k_i$ is a scale factor. An optimal scale factor k is determined using a minimum least squared error, for example:

$$\hat{L}_{error} = \hat{L}_{target} - \hat{L}_{computed} \quad (7)$$

Where $L_{target}$ represents a target load, $L_{computed}$ represents a computed load, and $L_{error}$ represents an error load.

Figure 9:
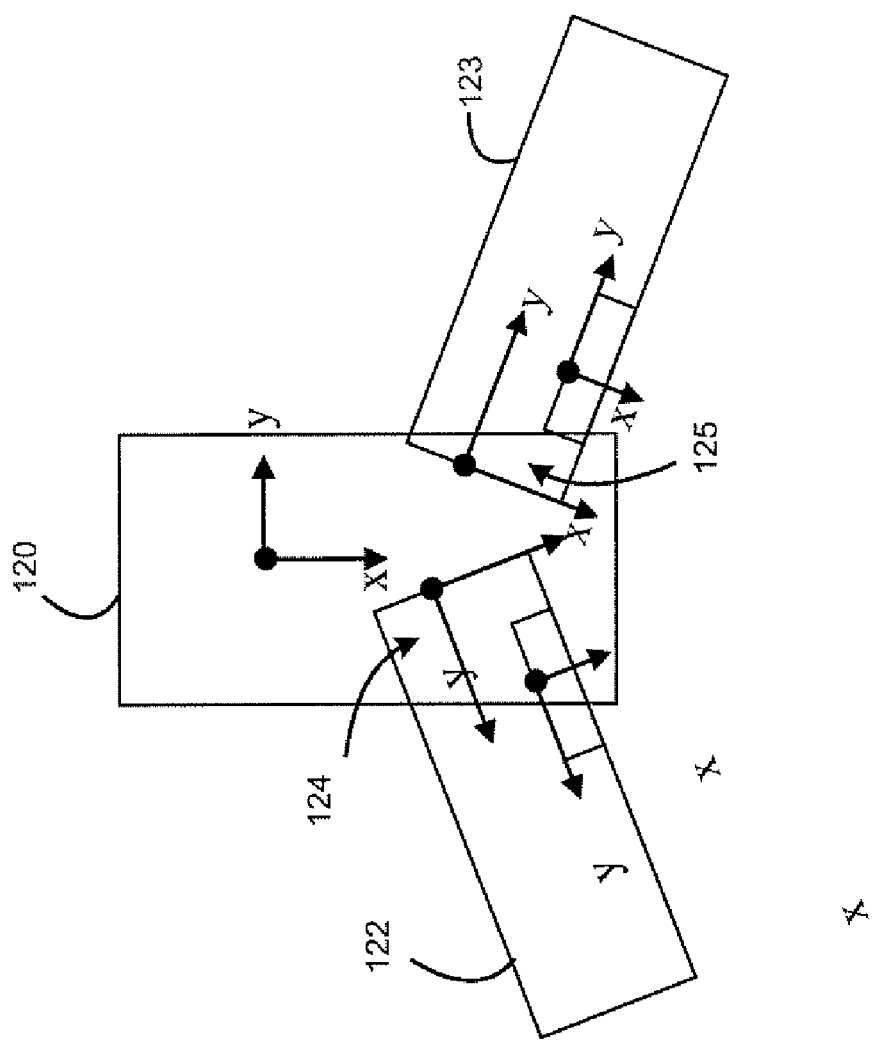
FIGS. 9 and 10 are illustrations of a match load method.
Figure 10:
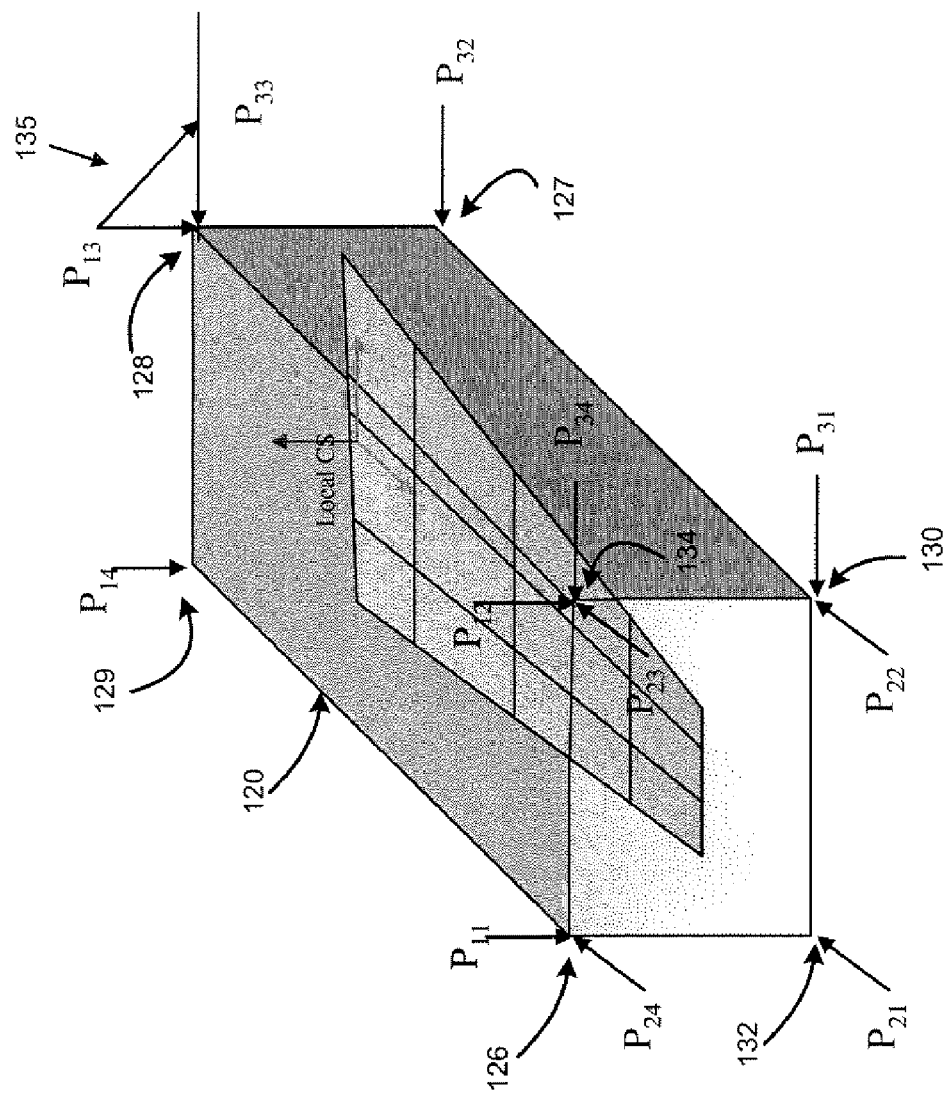

The second method matches the target loads by adjusting a single base pressure distribution. As shown in FIG. 9, bounding boxes 120-123 are placed around a region defined for each target load. Target loads are defined using a Load Reference Axis (LRA) object, a component model object, or both, as will be discussed further below. A directional pressure field is created for each bounding box 120-123 as shown in FIG. 10. Control parameters are the pressure vectors at $P_{ij}$ shown at the corners 126-134. A pressure vector is interpolated for each node based on the nodes position in the field. Pressure at the node is computed as:

$$p_{node} = \vec{p}_{field} \cdot \vec{n}_{node} \tag{8}$$

Where $P_{node}$ represents a pressure at the node. $P_{field}$ represents an interpolated pressure field vector. $N_{node}$ represents a node surface normal. Outside of the bounding box 120, the field effect is gradually washed out or ramped to zero as shown at 135.

Referring back to FIG. 9, in regions 124, 125 where the bounding boxes 120-123 overlap, or where the washout region bleeds into a neighboring bounding box 120-123, the node based pressure data are normalized. Normalization produces better overall results, and also provides a more robust model to the mathematical solver used in computing the final match loads solution. Normalization is performed on all node pressures as shown as:

$$p_{node\_norm} = p_{node} * k_{node} \tag{9}$$

The normalization factor $k_{node}$ is computed for each node based on the number of bounding boxes 120-123 that encompass the node. As can be appreciated, this factor may be computed in a variety of ways. For example, assuming a node is completely contained in only two bounding boxes, the default normalization factor for that node would be ½ or 1 divided by the number of enclosing boxes.

Referring back to FIG. 4, the geometry module 88 loads geometry object data; performs geometry grouping functions; manipulates the geometry; rotates and translates the geometry; and performs reads of control surface deflection information. The modeling module 90 models complete geometrics as a component model tree; specifies local coordinate systems and reference points for each component; and specifies component meta-data to read/write component level information from external sources into the component model tree. The applied loads module 92 reads applied loads from a variety of sources including external time history files and transfers applied loads to a load model. The applied loads module transfers the applied loads to a load model.

The history module 94 logs all operation commands and displays a history report that can be exported to a history file 66. As discussed above, the history file 66 can be saved and later re-executed.

Figure 11:
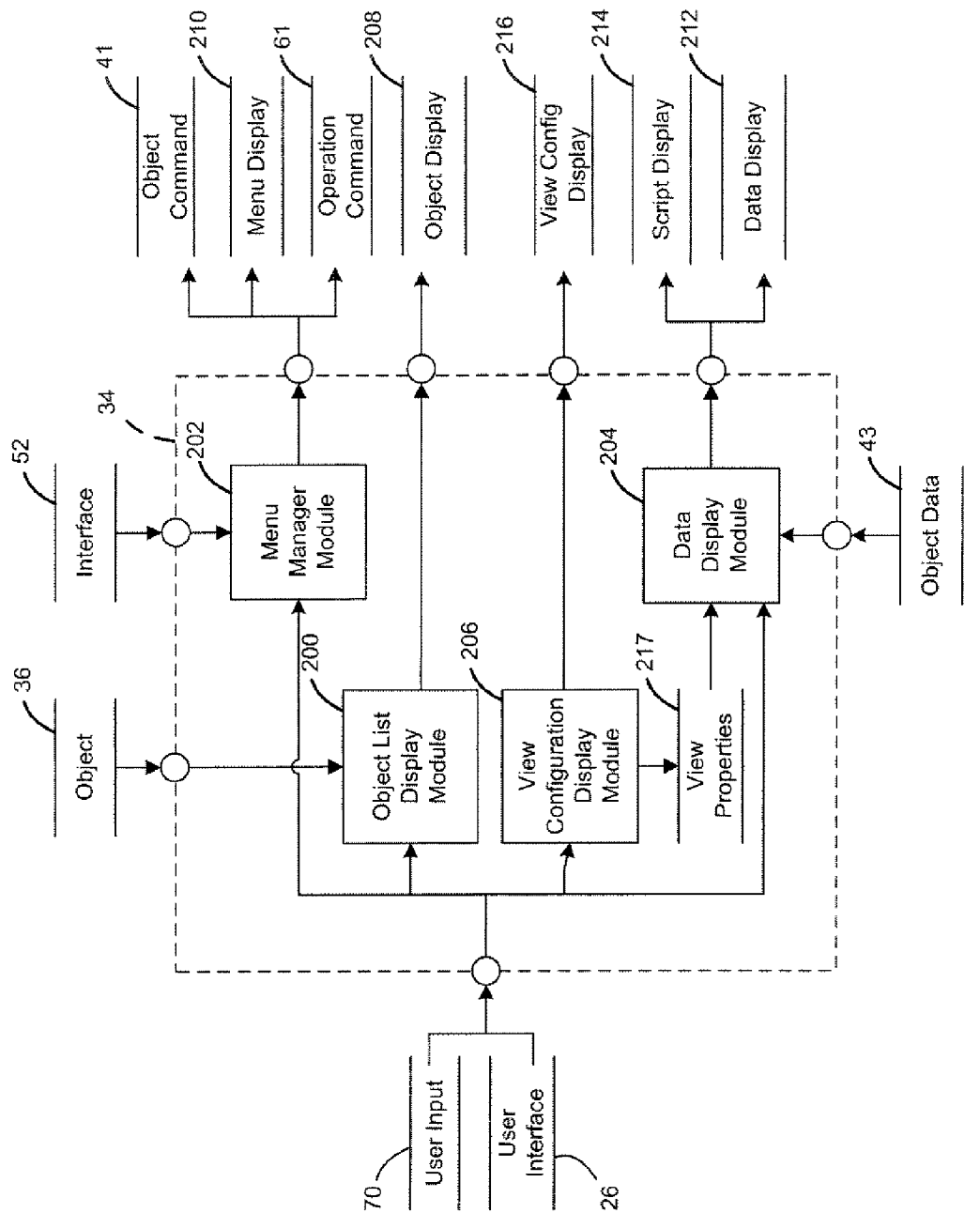
FIG. 11 is a dataflow diagram illustrating exemplary sub-modules of a user interface module.

Referring now to FIG. 11, a dataflow diagram illustrates an exemplary UI manager module 34 in more detail. The UI manager module 34 in the example of FIG. 11 includes an object list display module 200, a menu manager module 202, a data display module 204, and a view configuration display module 206. Each module receives and displays user interface data 65 and a corresponding user interface 26. As can be appreciated, the modules shown in FIG. 11 may be combined and/or partitioned to similarly manage at least one user interface 26.

The object list display module 200 displays the created objects 36. In an exemplary embodiment, the object list display module 200 displays the objects 36 in an object display 208 in a listed format. For example, the objects 36 are listed and associated according to a tree structure. The menu manager module 202 manages a plurality of menu displays 210 that list object creation interfaces 52 as well as load analysis operation interfaces 52. The menu manager module 202 generates the appropriate object command 42 or operation command 61 based on the selection of the menu interface indicated by the user input 70. The data display module 204 displays the object data 43 associated with the selected objects 36 in a data display 212. The data display 212 can display the object data 43 in a variety of formats including, but not limited to, a graph, a chart, and a table. The data display module 204 displays script data in a script display 214. The script display 214 can display the operations of the script associated with the operation and/or display a history of the operations performed on the listed objects. The view configuration display module 206 displays view properties in a view configuration display 216. Based on the user input 70, the view properties can be manipulated to alter the display of the data in the data display 212.

Figure 12:
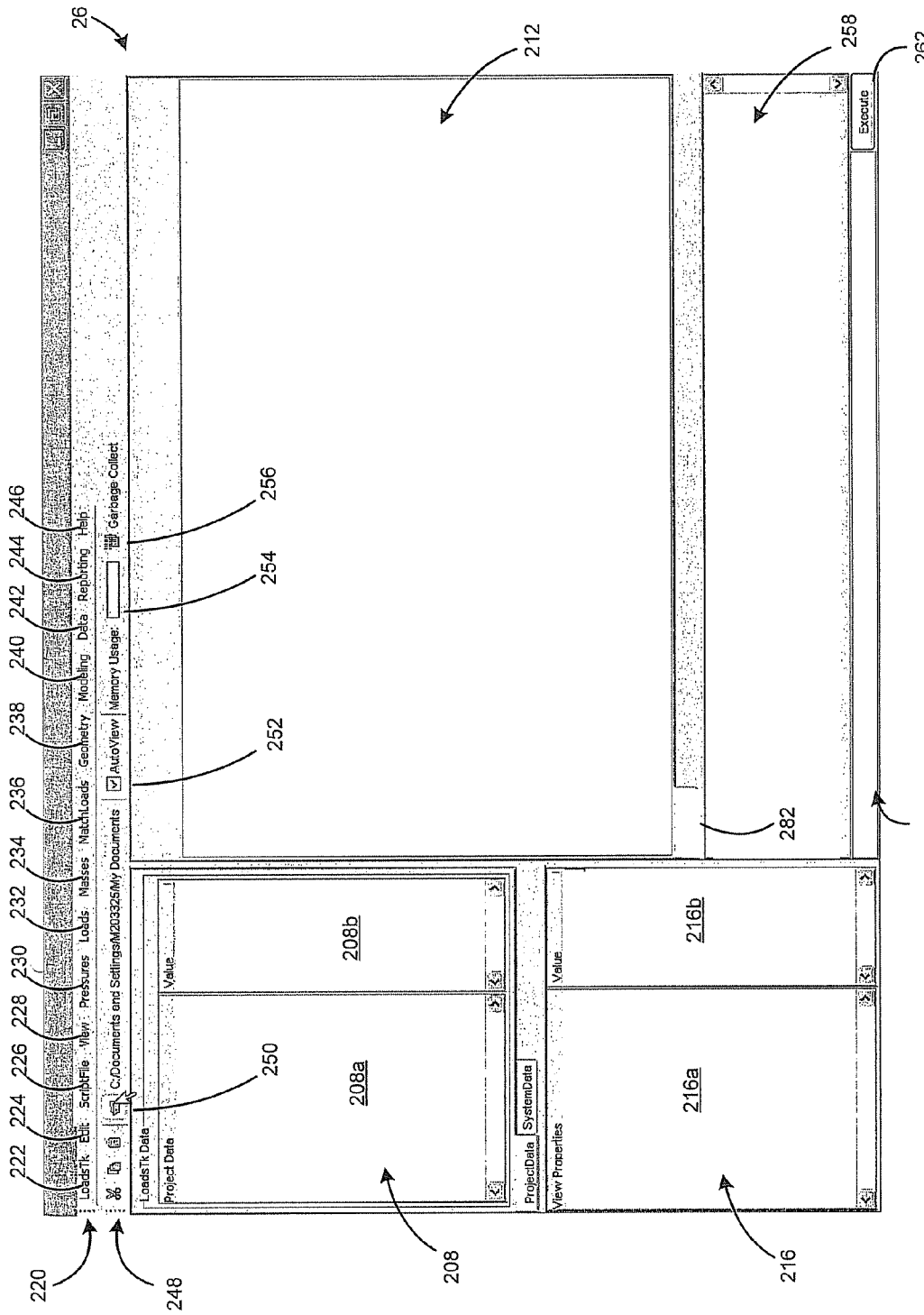
FIG. 12 is an exemplary illustration of a load analysis user interface.

Referring now to FIG. 12, an exemplary load analysis user interface 26 generated by the UI manager module 34 is shown. The user interface 26 includes the object display 208, the view configuration display 216, and the data display 212. The user interface 26 as shown in the example is a menu driven interface. The user interface 26 includes one or more drop-down menu displays 210 that can be accessed by a menu toolbar 220 or right-clicking on an object 36 (FIG. 2) within the object display 208. As can be appreciated, the user interface 26 can be implemented in varying formats without altering the functionality of the user interface 26. For example, each menu display 210 or element of the menu display 210 can be implemented as a dialog box or separate user interface. For ease of the discussion, the remainder of the disclosure will be discussed in the context of a menu-driven user interface.

As shown in FIG. 12, the menu toolbar 220 includes one or more drop-down menus including, but not limited to, a LoadsTk menu 222, an edit menu 224, a script file menu 226, a view menu 228, a pressure menu 230, a loads menu 232, a masses menu 234, a matchloads menu 236, a geometry menu 238, a modeling menu 240, a data menu 242, a reporting menu 244, and a help menu 246. Details of each menu will be discussed further below. A second toolbar 248 includes a directory selection icon 250, an auto view selection box 252, a memory usage meter display 254, and a garbage collect icon 256. The directory selection icon 250 allows a user to select a current working directory to which the load analysis data will be stored and retrieved. The auto view selection box 252, when selected, prevents data from being displayed in the data display 212. Turning the auto view selection box 252 off allows for enhanced performance in a data processing time. The memory usage meter display 254 provides an indication of how much storage is currently being utilized to process the current load analysis data.

The garbage collect icon 256, when selected, reclaims any discarded system memory and makes it available for additional loads analysis. A message display 258 displays output messages related to the operations being performed on the data, A command line box 260 accepts text input to allow for manual execution of the predefined operations. The manual operation is executed in response to a carriage return press, or when the execute button 262 is selected.

Figure 13A:
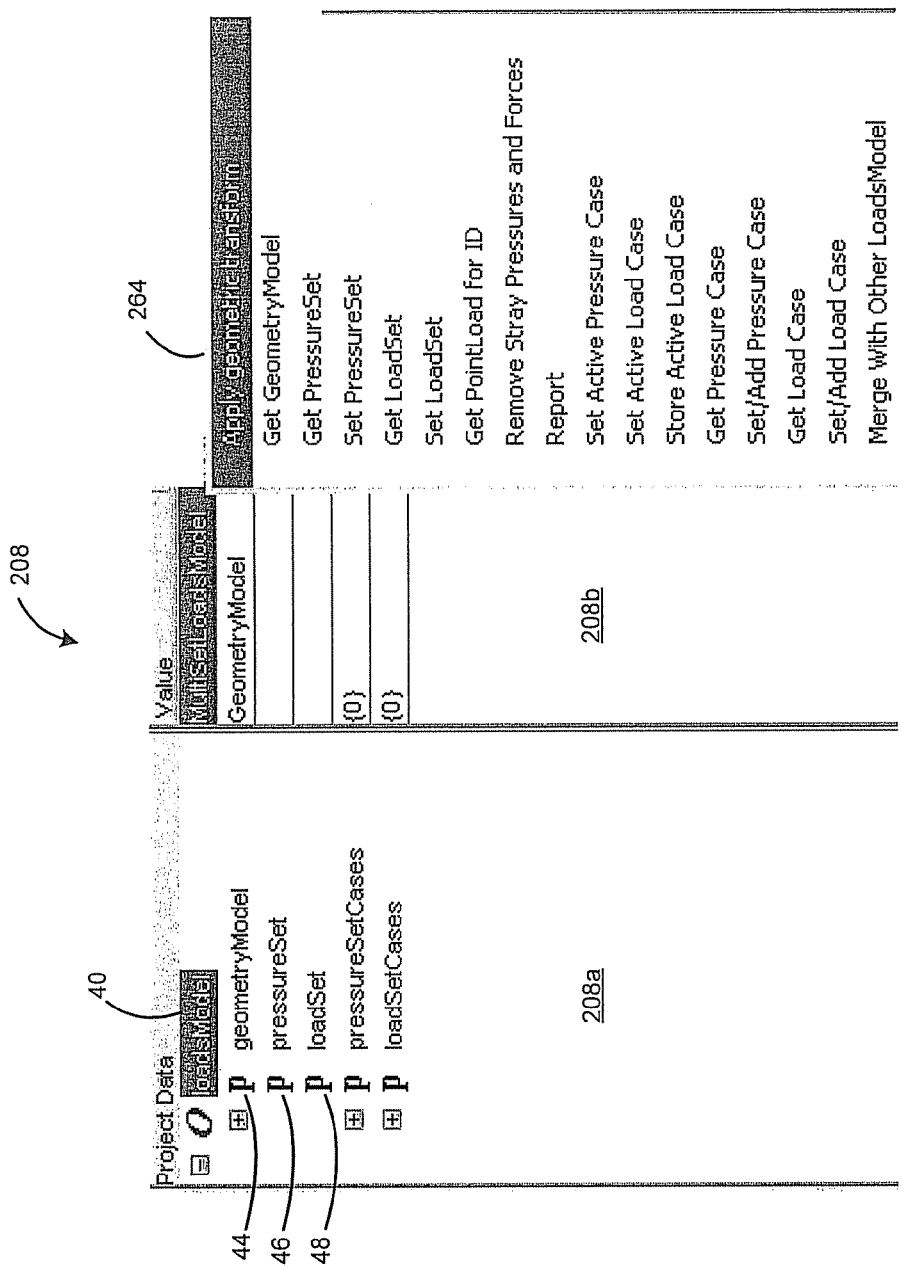
FIGS. 13a-13d are exemplary illustrations of object displays.
Figure 13B:
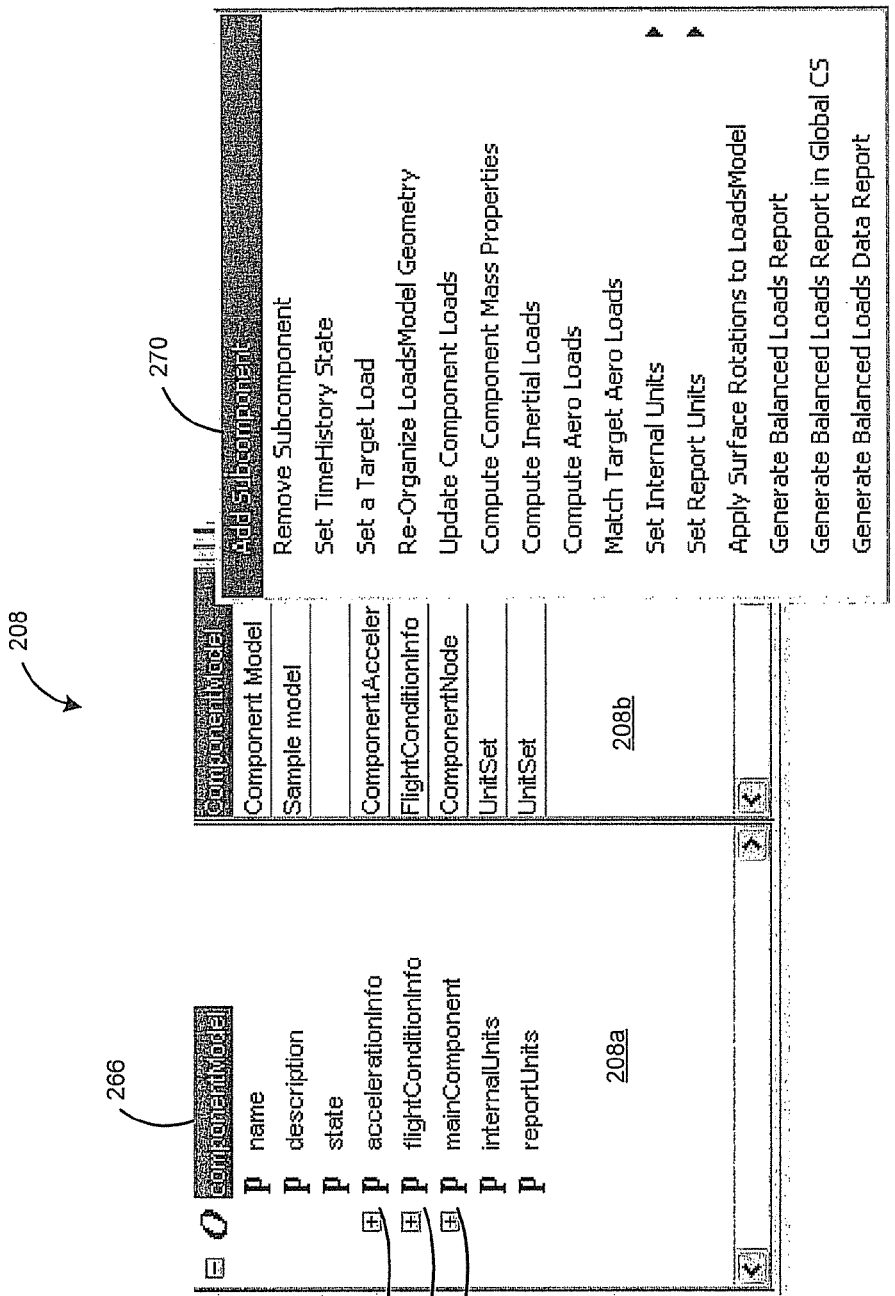

FIGS. 13a-13d illustrate exemplary embodiments of the object display 208 and exemplary embedded menus. For example, in FIG. 13a, the object display 208 is partitioned into a "Project Data" Section 208a and "Value" Section 208b. In FIG. 13a the "Project Data" Section 208a illustrates a load model 40, load model objects 44-48, and the "Value" Section 208b illustrates an embedded drop-down menu 264 that is associated with the load model 40. The menu 264 includes interfaces to operations that can be performed on the load model objects 44-48. In FIG. 13b, the example object display 208 illustrates a component model 266, component model objects 268a-268c, and an embedded drop-down menu 270 that is associated with the component model 266. The menu 270 includes interfaces to operations that can be performed on the component model 266. A component model 266 provides a hierarchical tree representation of geometry components. The component model may include coordinate system definitions and meta-data.

Figure 13C:
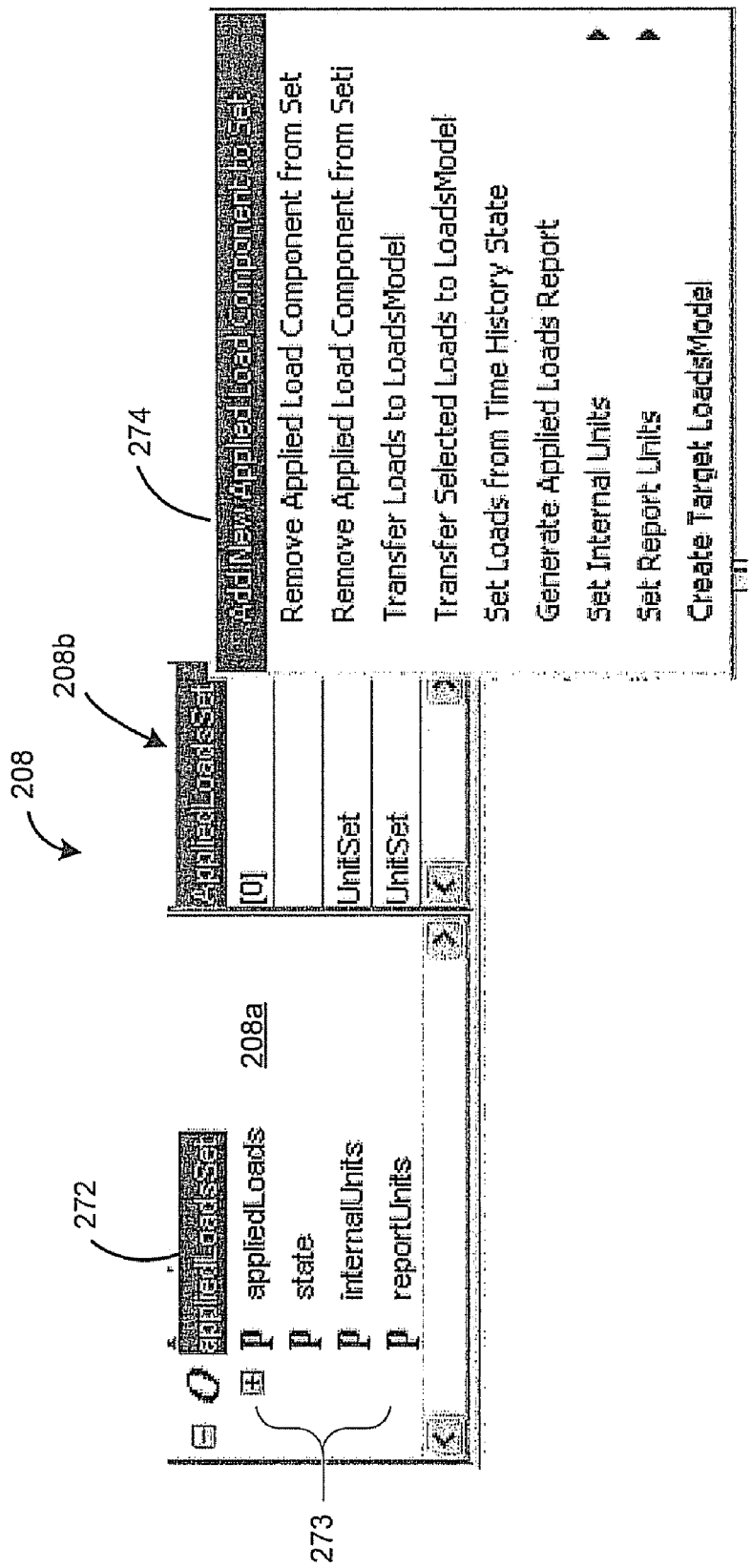
Figure 13D:
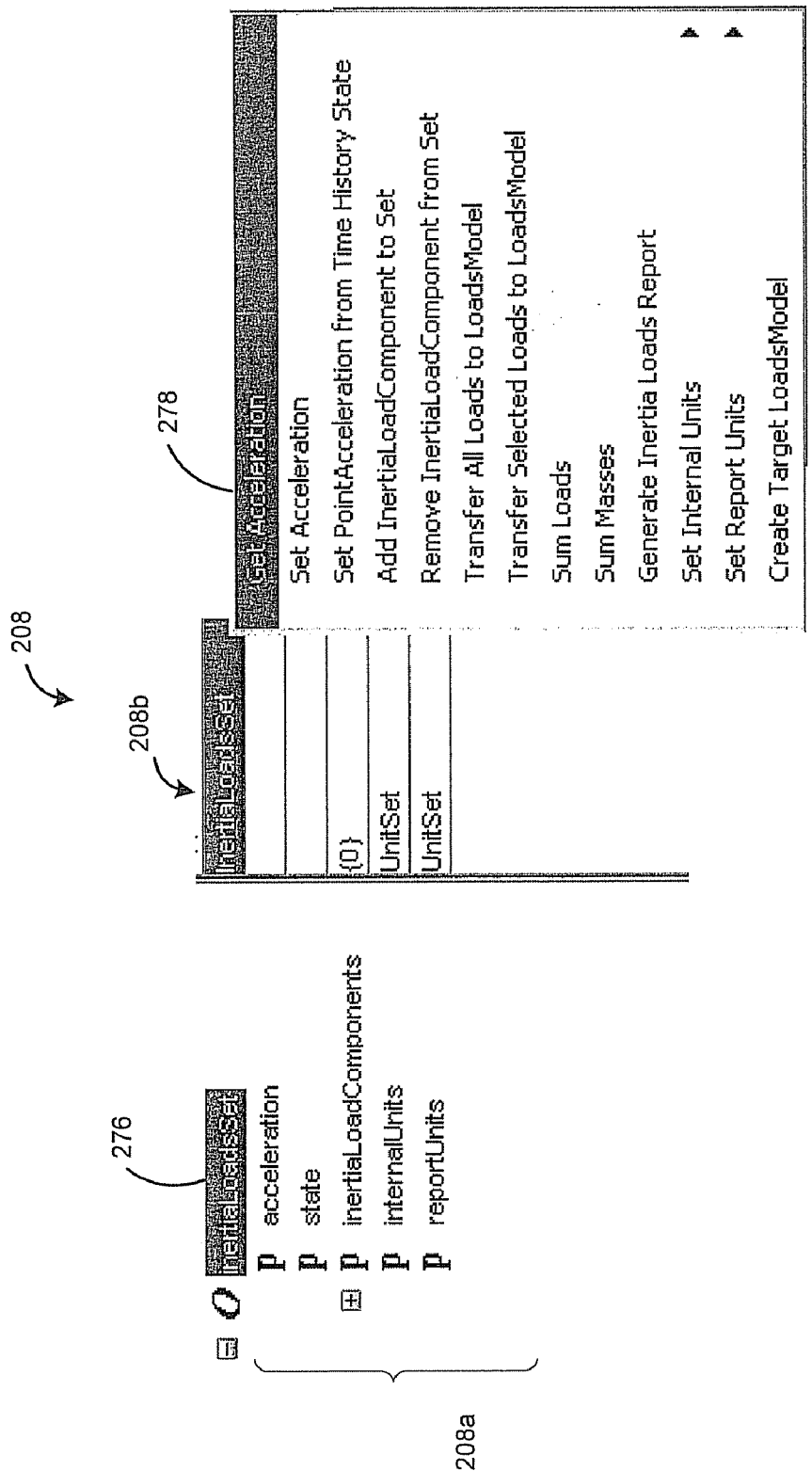

In FIG. 13c, the example object display 208 illustrates an applied load set object 272 and an embedded drop-down menu 274 that is associated with the applied load set object 272. The menu 274 includes interfaces to operations that can be performed on the applied load set object 272. The applied load set object 272 includes one or more load set objects 273. The applied load set object 273 represents an external load applied to a loads model 40 (FIG. 2). In FIG. 13d, the example object display 208 illustrates an inertial load set object 276 and an embedded drop-down menu 278 that is associated with the inertial load set object 276. The menu 278 includes interfaces to operations that can be performed on the inertial load set object 276. An inertial load set object 276 is a collection of concentrated mass objects, used to compute concentrated inertial loads and to transfer the inertial loads to a load model 40.

Referring now to FIGS. 12 and 14, the view configuration display 216 shown in FIG. 12 is partitioned into a "View Properties" Section 216a and a "Values" Section 216b. The View Properties Section 216a includes a listing of view properties 217, as shown in greater detail in FIG. 14, associated with the data currently displayed in the data display 212 (FIG. 12). For each view property 217a, a corresponding display value 280 is listed. The display value 280 can be adjusted by at least one of entering text input, selecting and de-selecting a selection box, and selecting an element of a selection menu. For more complicated view properties 217, a separate dialog box (not shown) may be generated to accept additional user input 70 (FIG. 2).

Figure 15A:
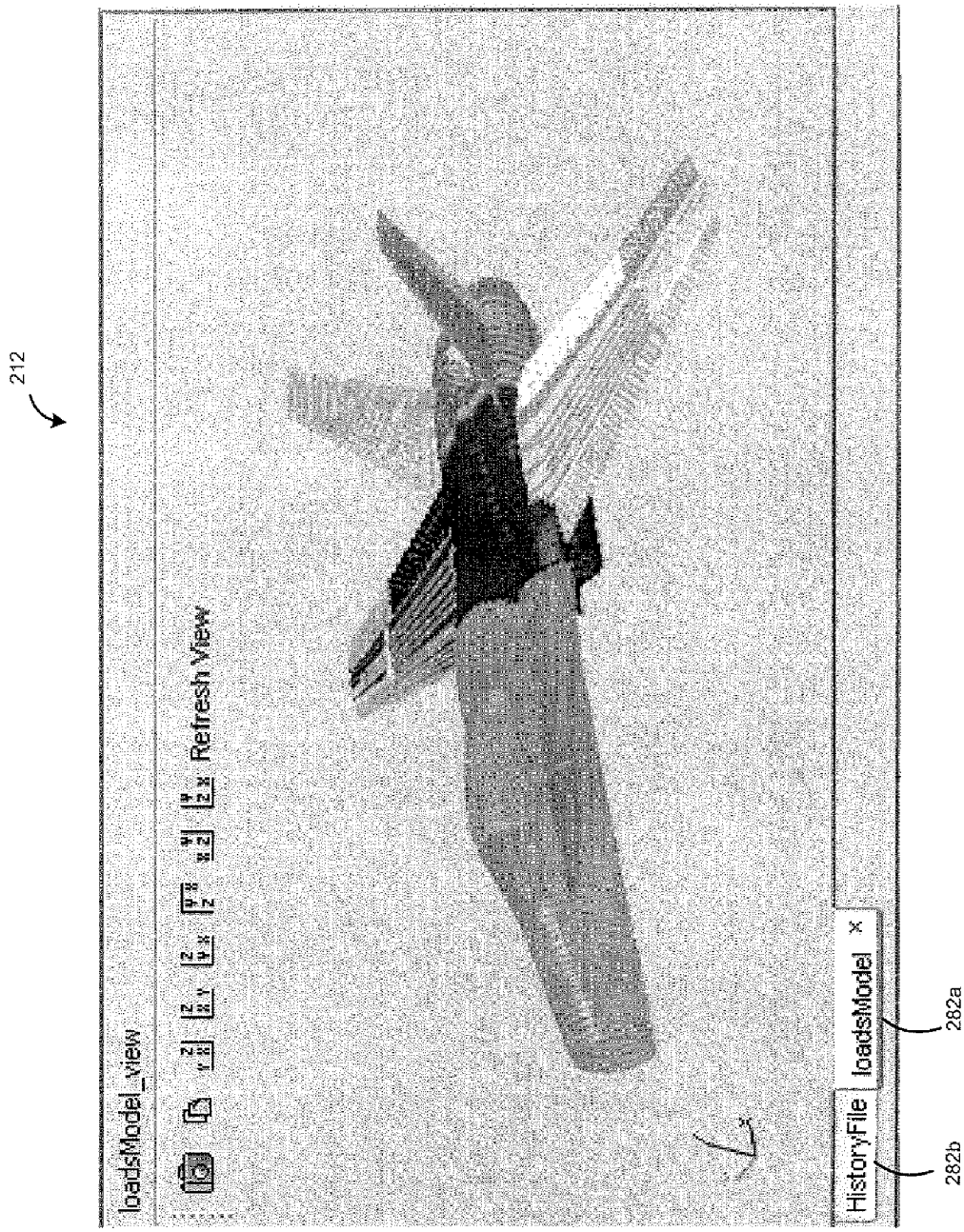
Figure 15B:
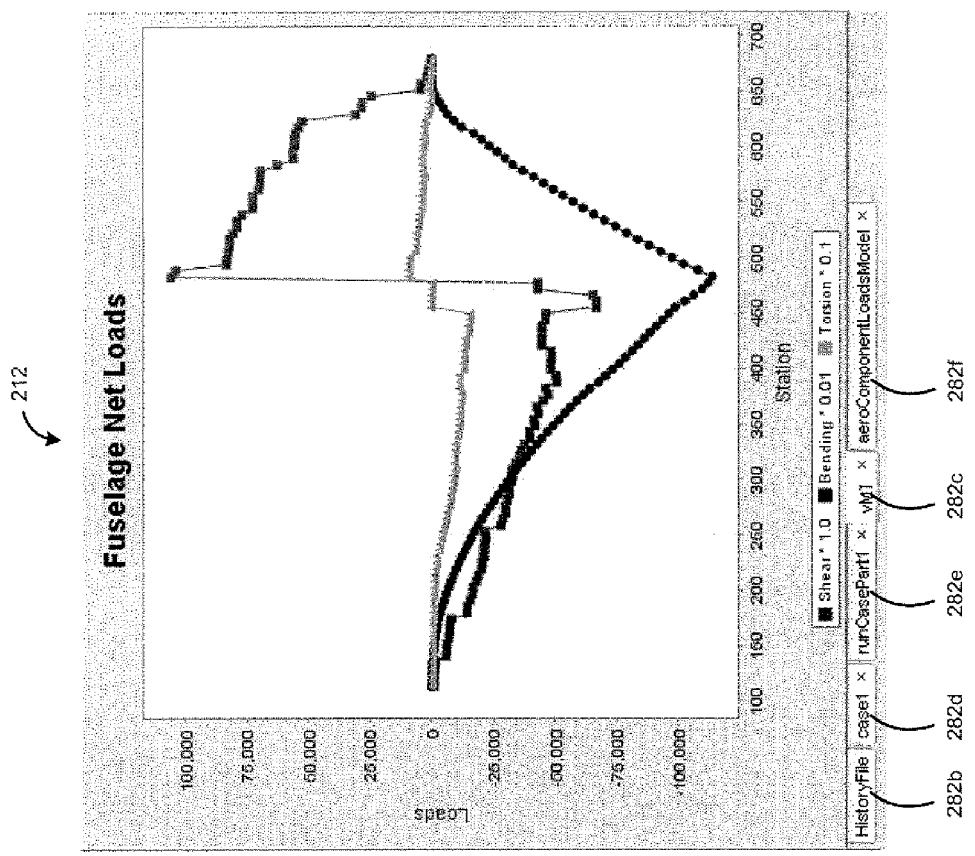

Referring now to FIGS. 15a-15c, exemplary data displays 212 are illustrated. Each data display 212 can be accessed by selecting a tab 282 (FIG. 1) labeled according to the data type. For example, in FIG. 15a, by selecting the "LoadsModel" tab 282a of the data display 212, an interface displaying the data associated with the geometry model object 44 (FIG. 3) is displayed. Each data display 212 displays the data according to at least one of a geometry display (as shown in FIG. 15a), a graphical display (as shown in FIG. 15b), and a data report display (as shown in FIG. 15c). The geometry display as shown in FIG. 15a can rotate, translate, and zoom on the geometry model object 44 (FIG. 3) based on user input 70 (FIG. 2). For example, by clicking on the image and dragging the mouse 16 (FIG. 1), the image can be rotated.

Figure 16B:
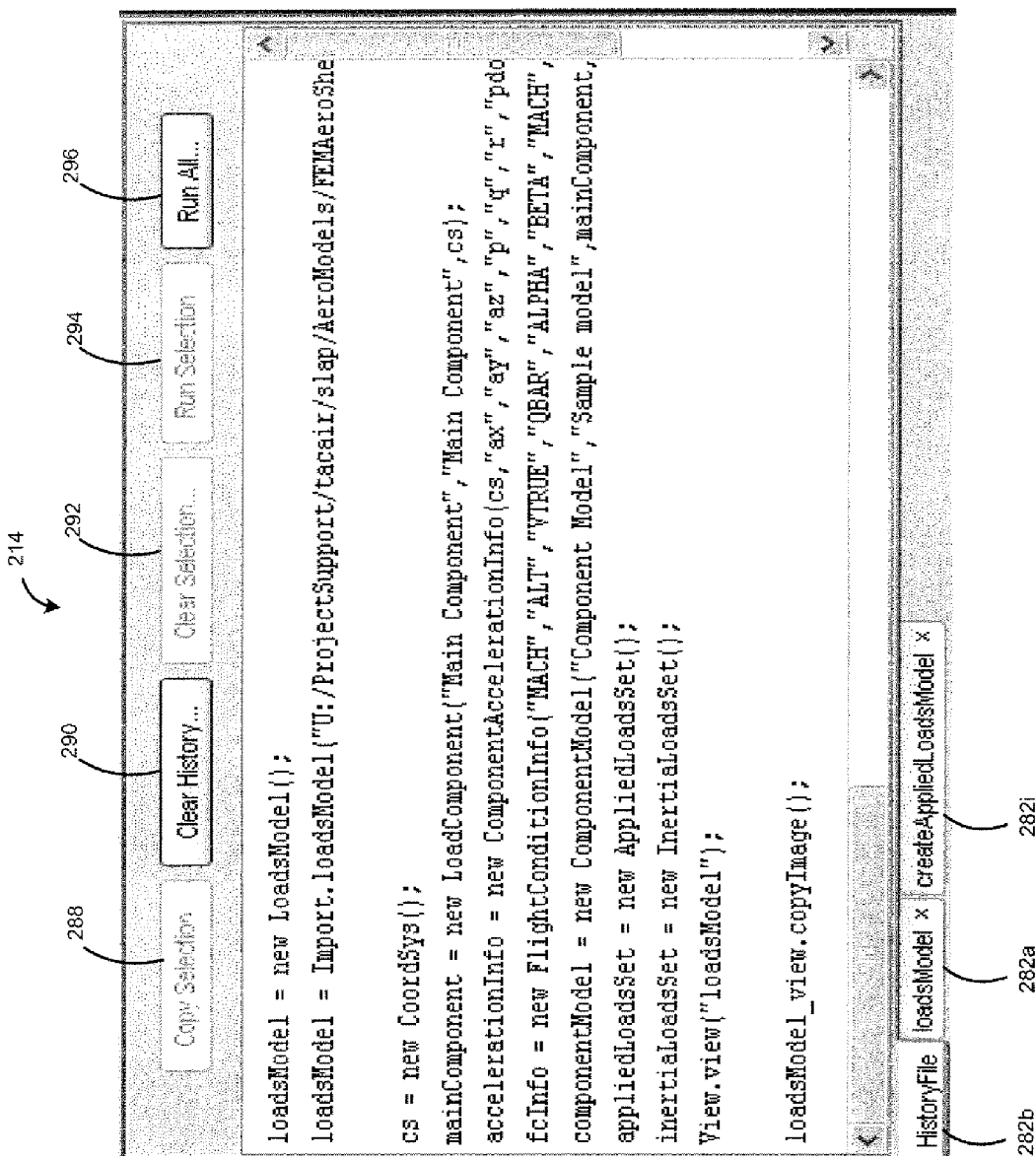

Referring to FIGS. 16a and 16b, exemplary script displays 214 are illustrated. Each script display 214 can be accessed by selecting a tab 282 labeled according to the script file type. For example, in FIG. 16a, by selecting the "createApplied-LoadsModel" tab 282i, the script display 214 displays the content of a script 62 (FIG. 2). The script display 214 accepts text input to allow the user to alter the contents of the script 62 (FIG. 2). A run selection button 284 and a run all button 286, when selected, causes all or part of the script 62 (FIG. 2) to be executed. In FIG. 16b, by selecting the "HistoryFile" tab 282b, the script display 214 displays a history file 66 containing a history of the operations performed. A copy selection button 288, a clear history button 290, and a clear selection button 292, when selected, causes the content of the history file 66 displayed to be altered. A run selection button 294 and a run all button 296, when selected, executes part of or all of the operations displayed in the history file 66.

Figure 17:
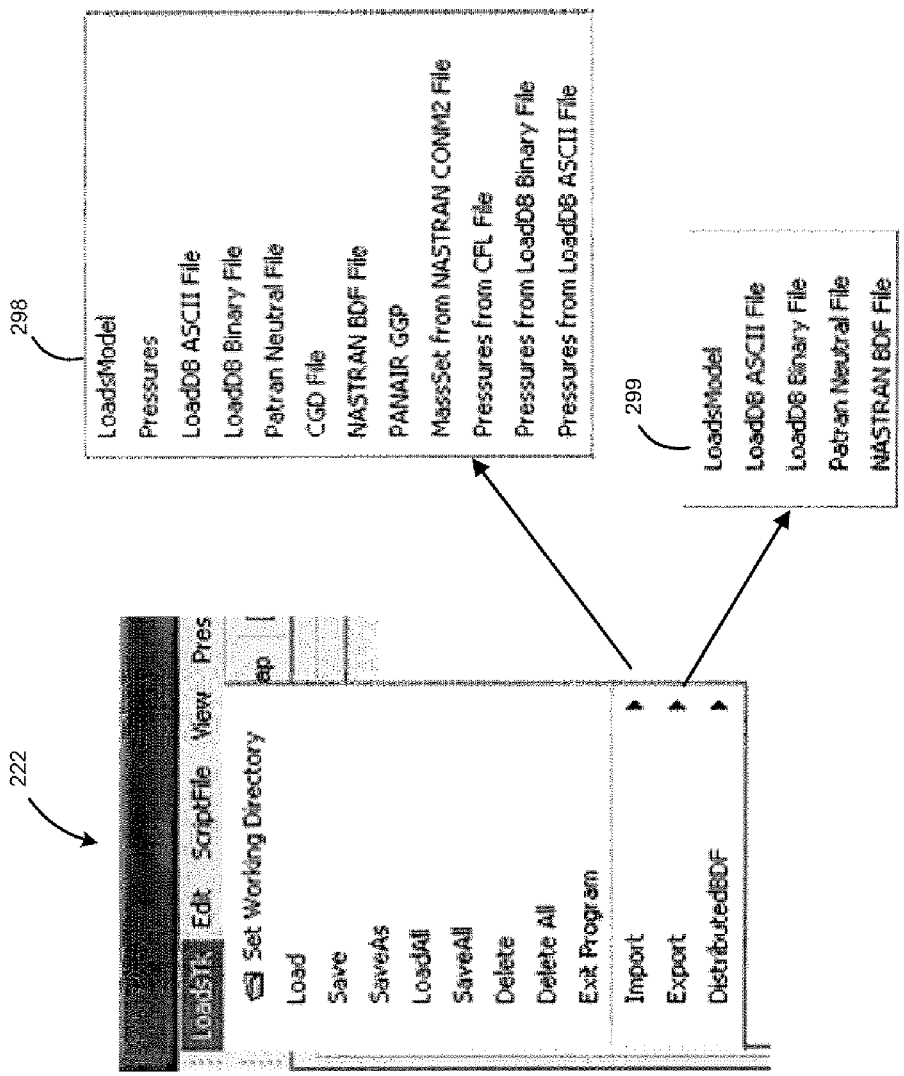
FIG. 17 is an exemplary illustration of a main menu and corresponding sub-menus.

Referring now to FIG. 17, an exemplary Loads menu 222 and corresponding sub-menus 298, 299 are illustrated in more detail. The Loads menu 222 in the example of FIG. 17, includes a list of operations that, when selected, retrieve, save, and delete load data. More specifically, import and export operations shown in the sub-menus 298, 299 respectively allow data to be imported and exported in a variety of formats.

Figure 19:
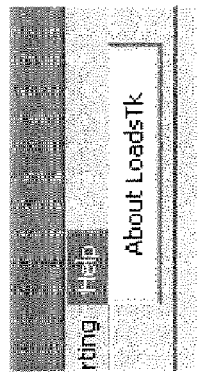
FIG. 19 is an exemplary illustration of a help menu.
Figure 21:
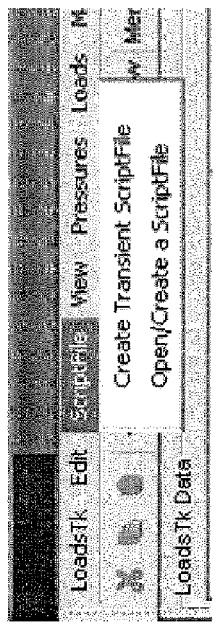
FIG. 21 is an exemplary illustration of a script file menu.
Figure 18:
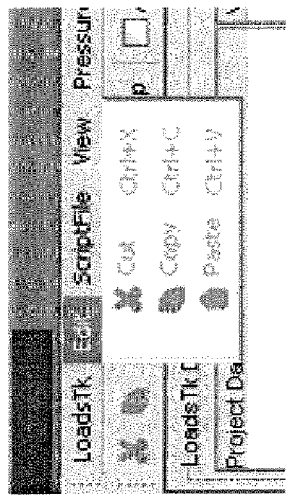
FIG. 18 is an exemplary illustration of an edit menu.
Figure 20:
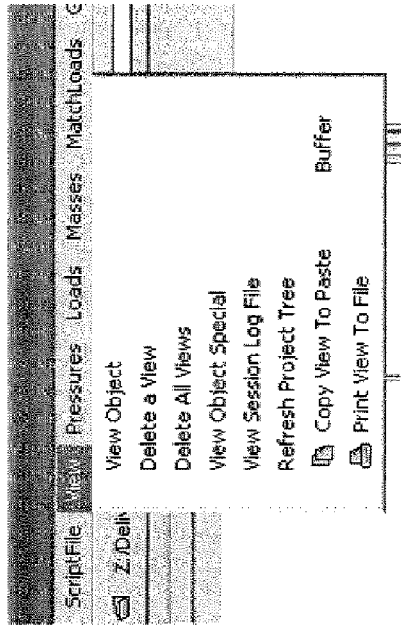
FIG. 20 is an exemplary illustration of a view menu.

Referring now to FIGS. 18-21, in FIG. 18, an exemplary edit menu 224 is illustrated in more detail. The edit menu 224 includes a listing of edit operations that can be performed on user interface data 65 (FIG. 2) displayed in the data displays 212 (FIGS. 15a-15c) or script displays 214 (FIGS. 16a, 16b). For example, edit operations such as cut, copy, and paste are listed. FIG. 19 is an exemplary help menu 246 shown in more detail. The help menu 246 includes an about operation that generates a help display (not shown). The help display (not shown) includes information about the load analysis software 24 (FIG. 1) and provides instructions relating to performing operations or creating objects 36 in the load analysis software 24 (FIG. 1). FIG. 20 is an exemplary view menu 228 shown in more detail. The view menu 228 includes view operations that can be used to alter the view of either the object display 208 or the data display 212. For example, view operations such as view object, delete a view, and refresh are listed. In FIG. 21, an exemplary script file menu 226 is shown in more detail. The script file menu 226 includes script file operations that can be used to create various script files 62 (FIG. 2). An existing script file 62 can be opened to the script display 214 or a new script file 62 can be created. A transient script file is a temporary script that has not been assigned to an outside file name. Any script can be made non-transient by saving it to a file.

Figure 22:
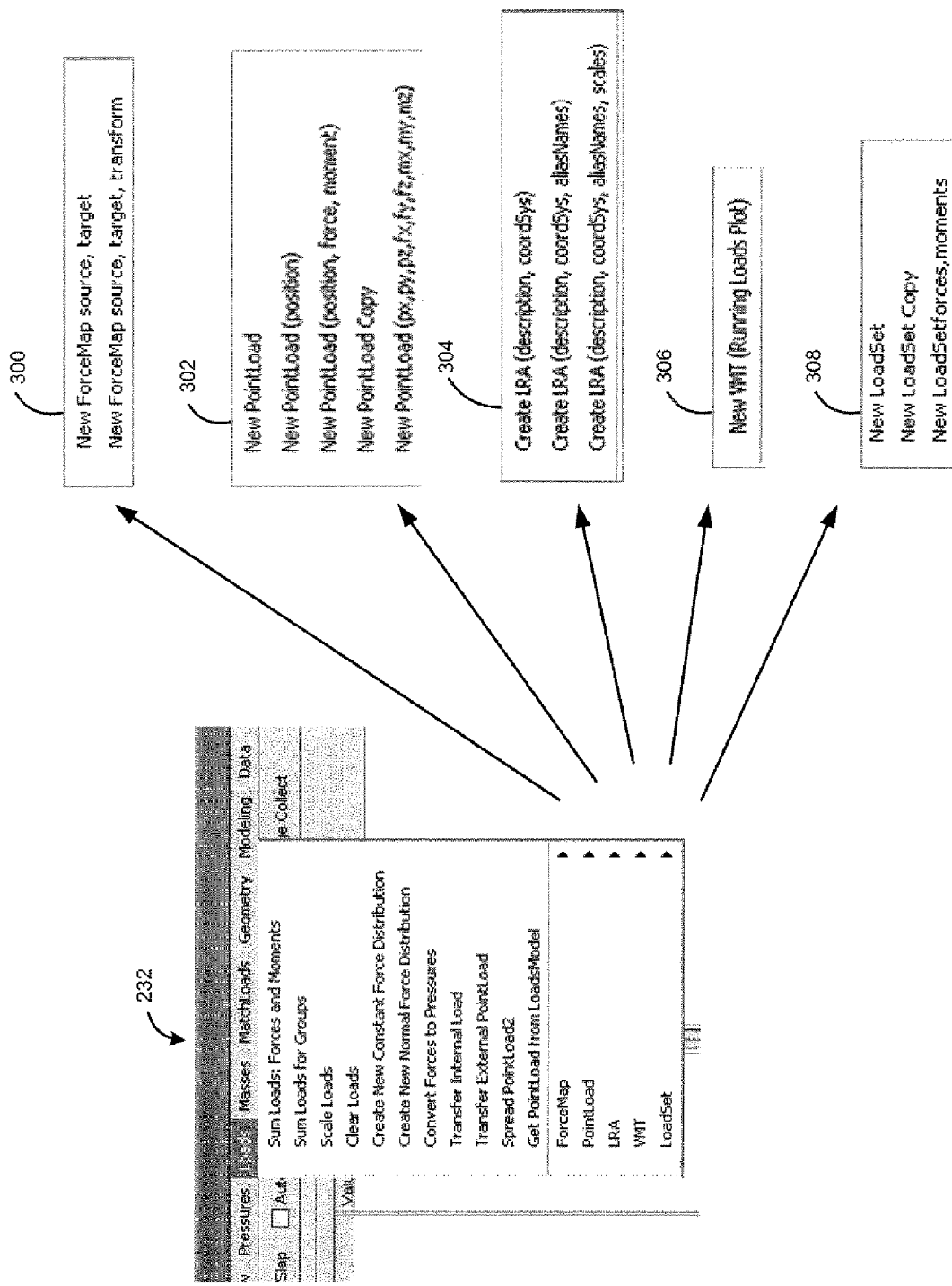
FIG. 22 is an exemplary illustration of a load menu and corresponding sub-menus.

Referring now to FIG. 22, an exemplary loads menu 232 and corresponding loads sub-menus 300-308 are shown in more detail. The loads menu 232 includes force and load operations that can be performed on force and load objects or that can be used to create force and load objects. For example, the force operations provide the ability to: sum forces over an entire load model; sum forces of selected groups in a load model; clear forces; create a constant force distribution; create a constant force distribution in a direction of element normals; and convert forces to pressures. A force map sub-menu 300, provides operations to create force map objects. A point load sub-menu 302 provides operations to create point load objects that include a force and a moment vector at a position. A Load Reference Axis (LRA) sub-menu 304 provides operations for creating an LRA object 312 that defines a local coordinate system, alias names, scale factors, etc. Upon selecting an LRA operation, an LRA dialog box 310 is generated that accepts text input for defining an LRA object 312. An exemplary LRA dialog box 310 is shown in FIG. 23. An exemplary LRA object 312 is shown in FIG. 24.

Figure 25:
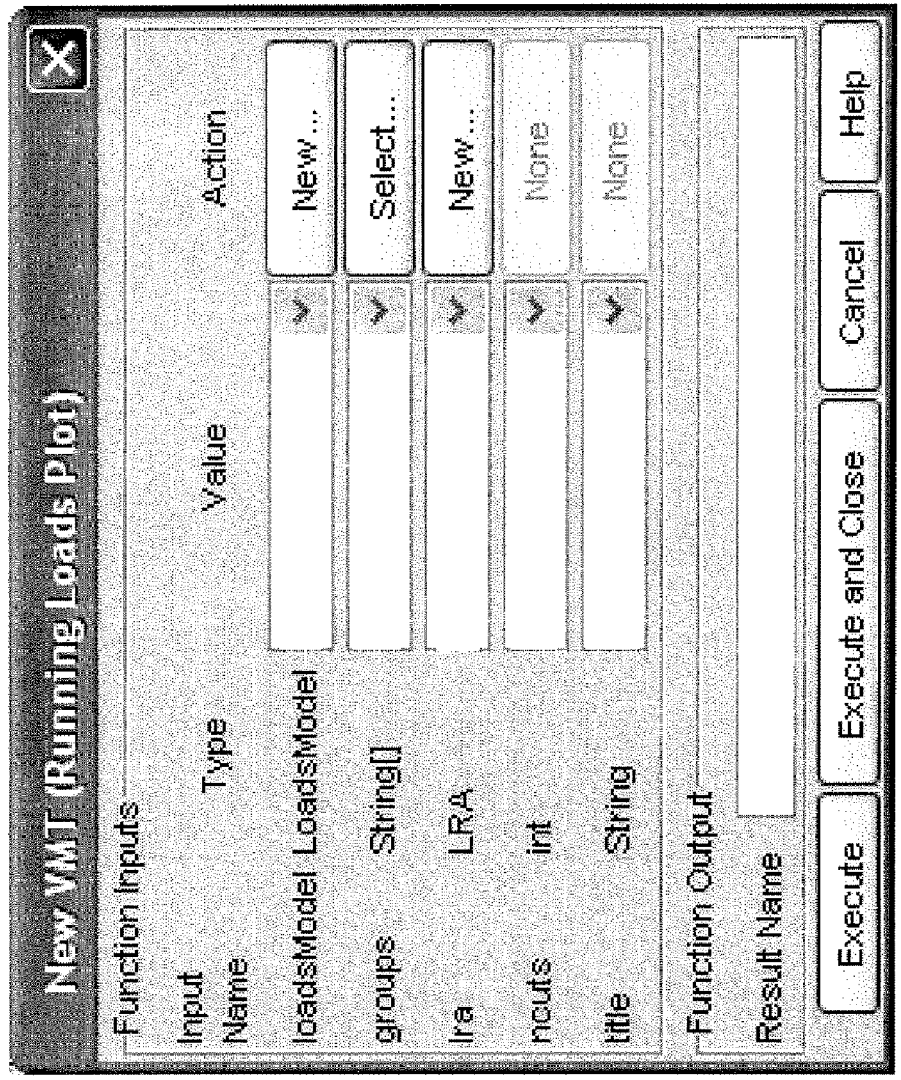
FIG. 25 is an exemplary illustration of a VMT dialog box.

Referring back to FIG. 22, a VMT sub-menu 306 provides an operation for creating a VMT object that defines a shear, bending, and torsion diagram as shown in FIG. 15b. The VMT object is created using a load model 40 (FIG. 2) and data object 43 (FIG. 2) for a current force set object 48 (FIG. 3). Upon selecting the New VMT operation, a VMT dialog box 314 is generated that accepts text input for defining the VMT object. An exemplary VMT dialog box 314 is shown in FIG. 25. Referring back to FIG. 22, a LoadSet sub-menu 308 provides operations for creating load set objects.

Figure 26:
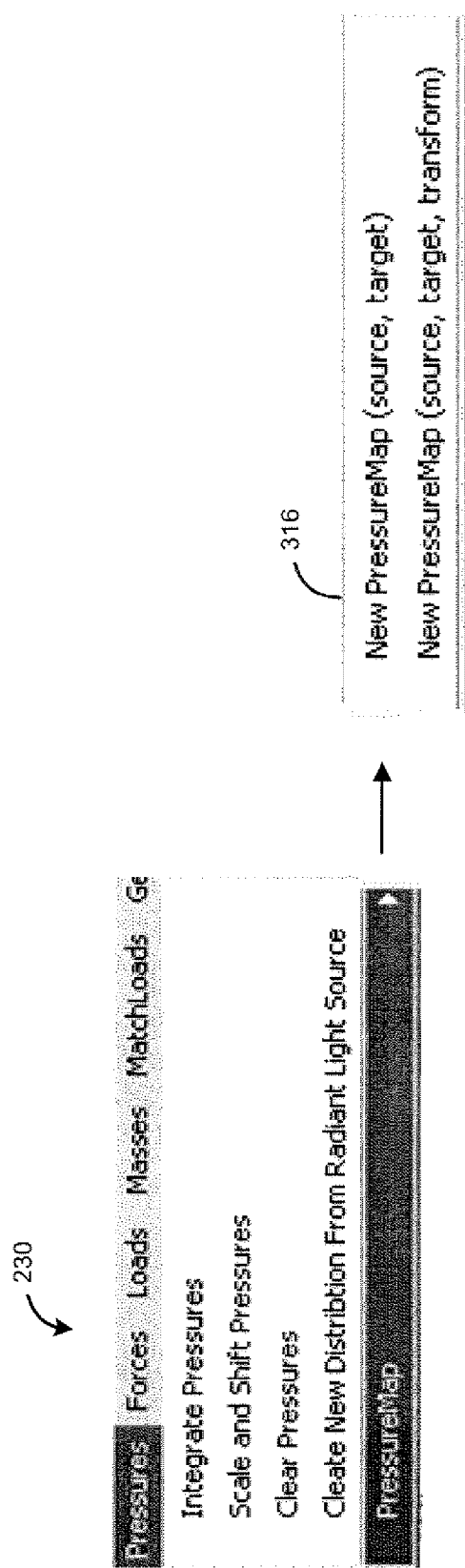
FIG. 26 is an exemplary illustration of a pressure menu and a corresponding sub-menu.

Referring now to FIG. 26, an exemplary pressure menu 230 and a corresponding pressure sub-menu 316 are shown in more detail. The pressure menu 230 includes pressure operations that can be performed on pressure objects or that can be used to create pressure objects. For example, the pressure operations provide the ability to: integrate pressure data into distributed loads; scale and shift pressure data; clear pressure objects; and create new pressure distributions. A pressure map sub-menu 316 provides operations for creating a pressure map object.

Figure 27:
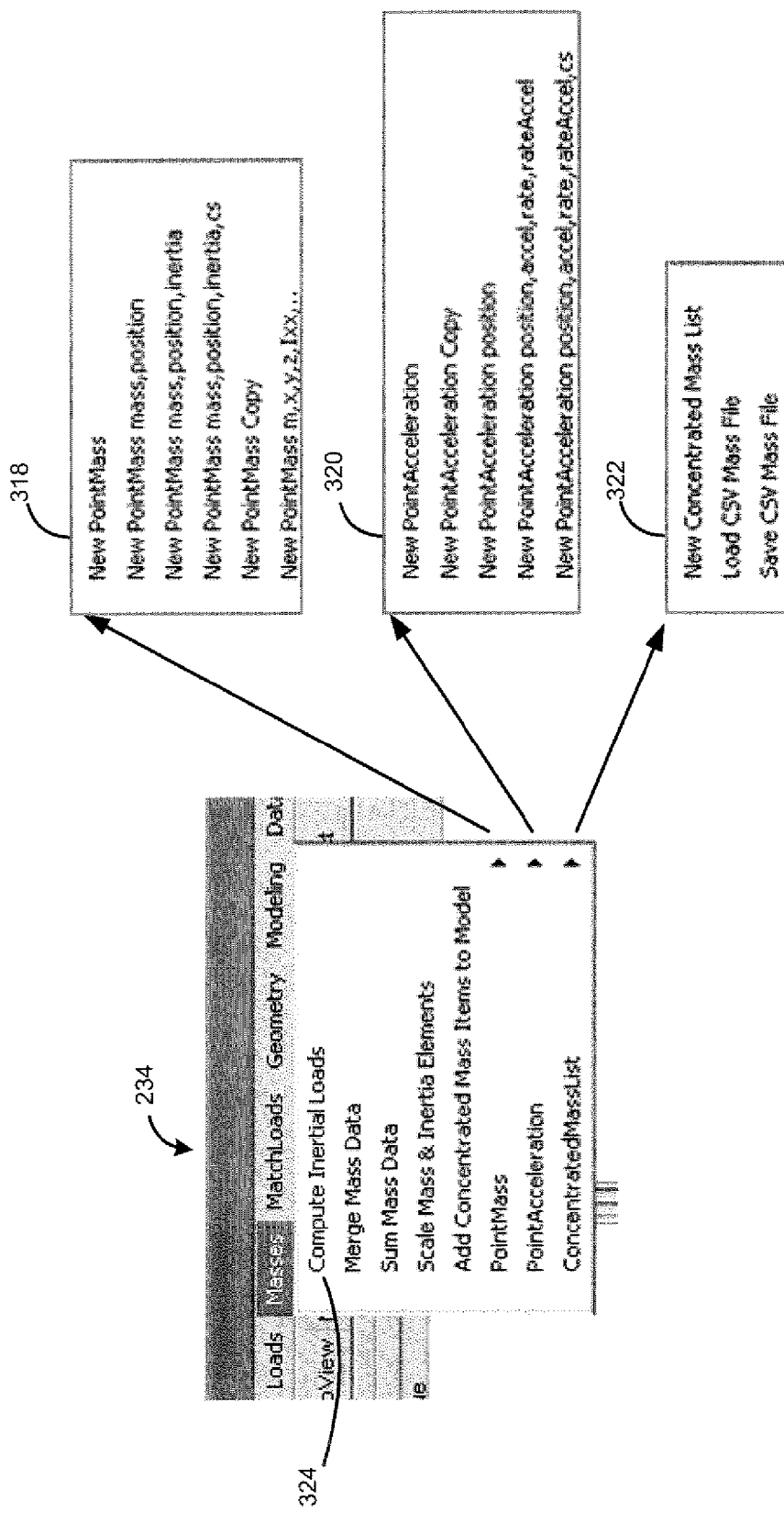
FIG. 27 is an exemplary illustration of a mass menu and corresponding sub-menus.
Figure 28:
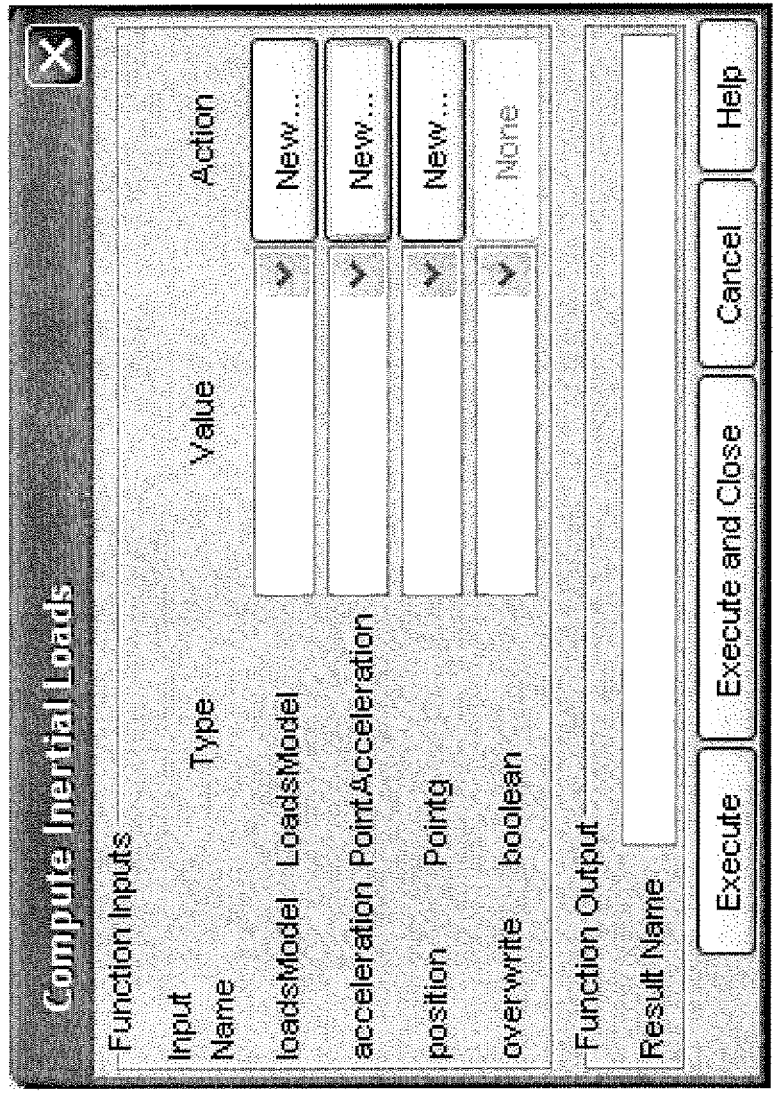
FIG. 28 is an exemplary illustration of a compute inertial loads dialog box.

Referring now to FIG. 27, an exemplary masses menu 234 and corresponding sub-menus 318-322 are shown in more detail. The masses menu 234 includes mass operations that can be performed on mass objects or that can be used to create mass objects. For example, the mass operations provide the ability to: create point masses; manipulate point masses (e.g., scale, add, subtract); create point accelerations; create new concentrated mass lists; and compute inertial loads. A point acceleration sub-menu 320 provides operations for creating point acceleration objects based on at least one of a linear acceleration vector (Ax, Ay, Az), a rotation vector (p,q,r), a rotation acceleration vector (pdot, qdot, and rdot), and a reference position (x,y,z). Upon selecting the compute inertial loads operation, a compute inertial loads dialog box 326 is generated that accepts text input to generate an inertial load object. An exemplary inertial load dialog box 326 is shown in FIG. 28. The inertial load object is computed by multiplying data from a point mass object with data from a point acceleration object.

Figure 29:
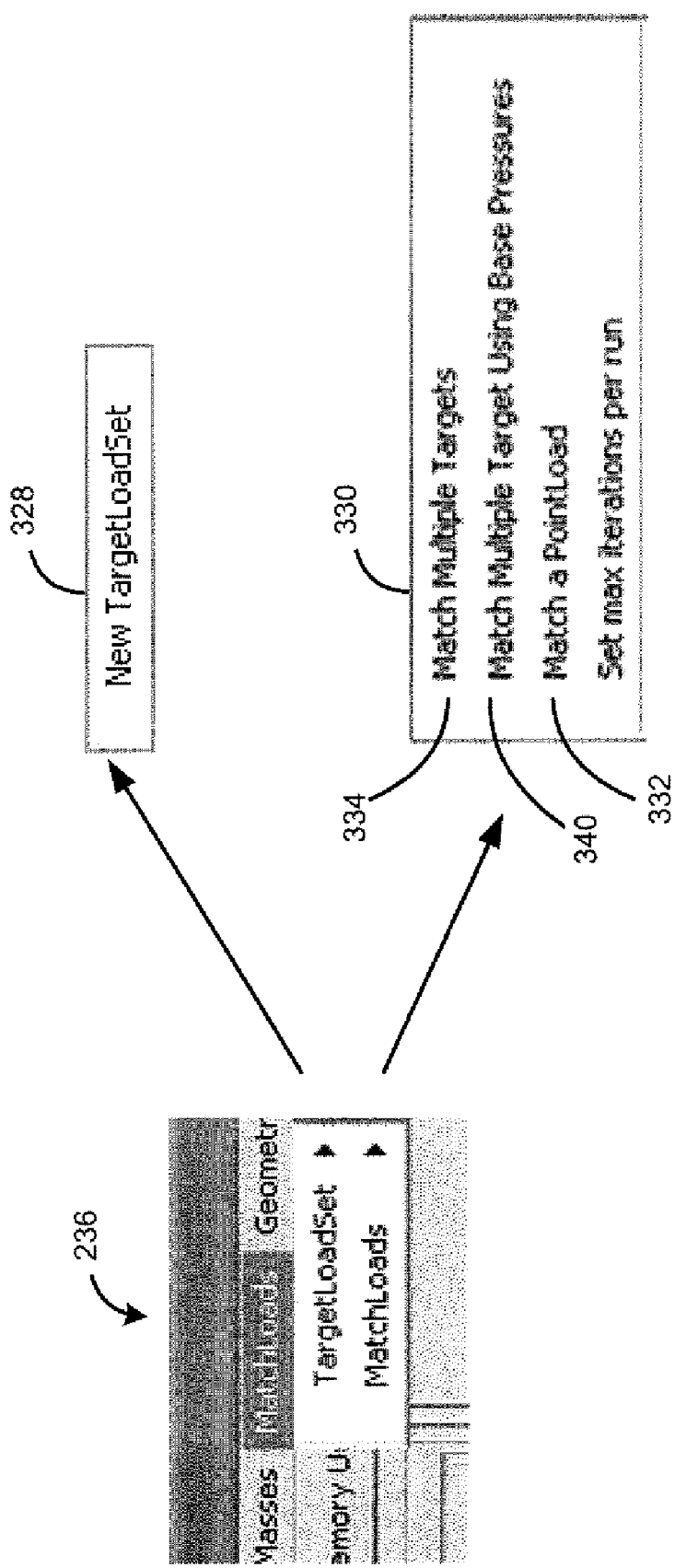
FIG. 29 is an exemplary illustration of a matchloads menu and corresponding sub-menus.
Figure 30:
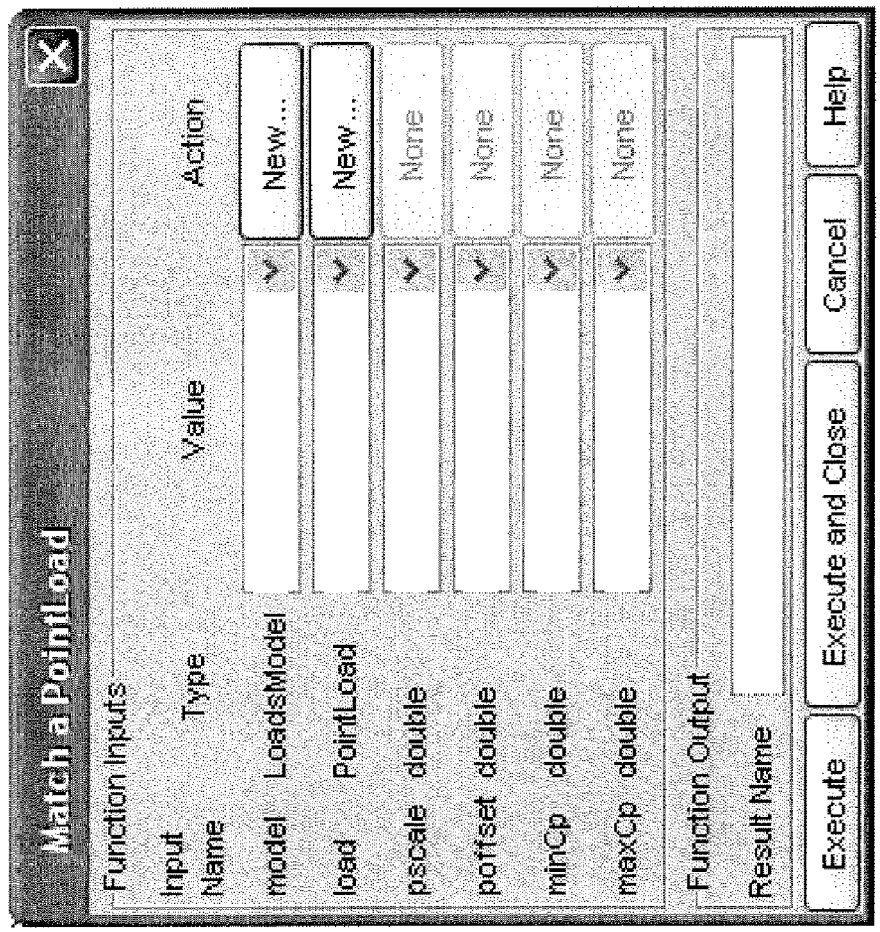
FIG. 30 is an exemplary illustration of a match pointload dialog box.
Figure 31:
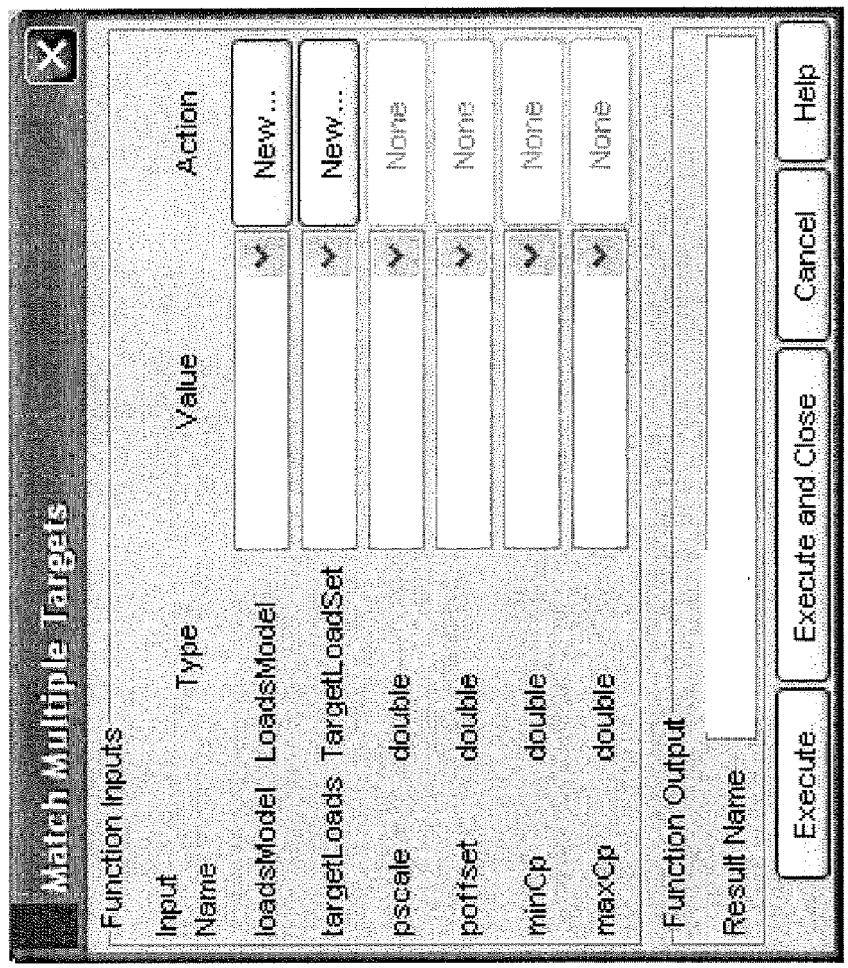
FIG. 31 is an exemplary illustration of a match multiple targets dialog box.

Referring now to FIG. 29, an exemplary matchloads menu 236 and corresponding sub-menus 328, 330 are shown in more detail. The matchloads menu 236 includes matchload operations that can be performed on load model objects or point load objects or that can be used to create target load model objects. The matchloads sub-menu 330 provides operations for matching target loads using a linear combination of base pressure distributions or by adjusting a single base pressure distribution. For example, upon selecting a match a pointload operation 332, a match pointload dialog box 336 is generated that accepts text input to generate a match pointload object. An exemplary match pointload dialog box 336 is shown in FIG. 30. In FIG. 29, upon selecting the match multiple targets operation 334, a match multiple targets dialog box 338 is generated that accepts text input to generate a match multiple target object. An exemplary match multiple targets dialog box 338 is shown in FIG. 31. Upon selecting a match multiple target loads operation 340, multiple target loads can be mapped simultaneously.

Figure 32A:
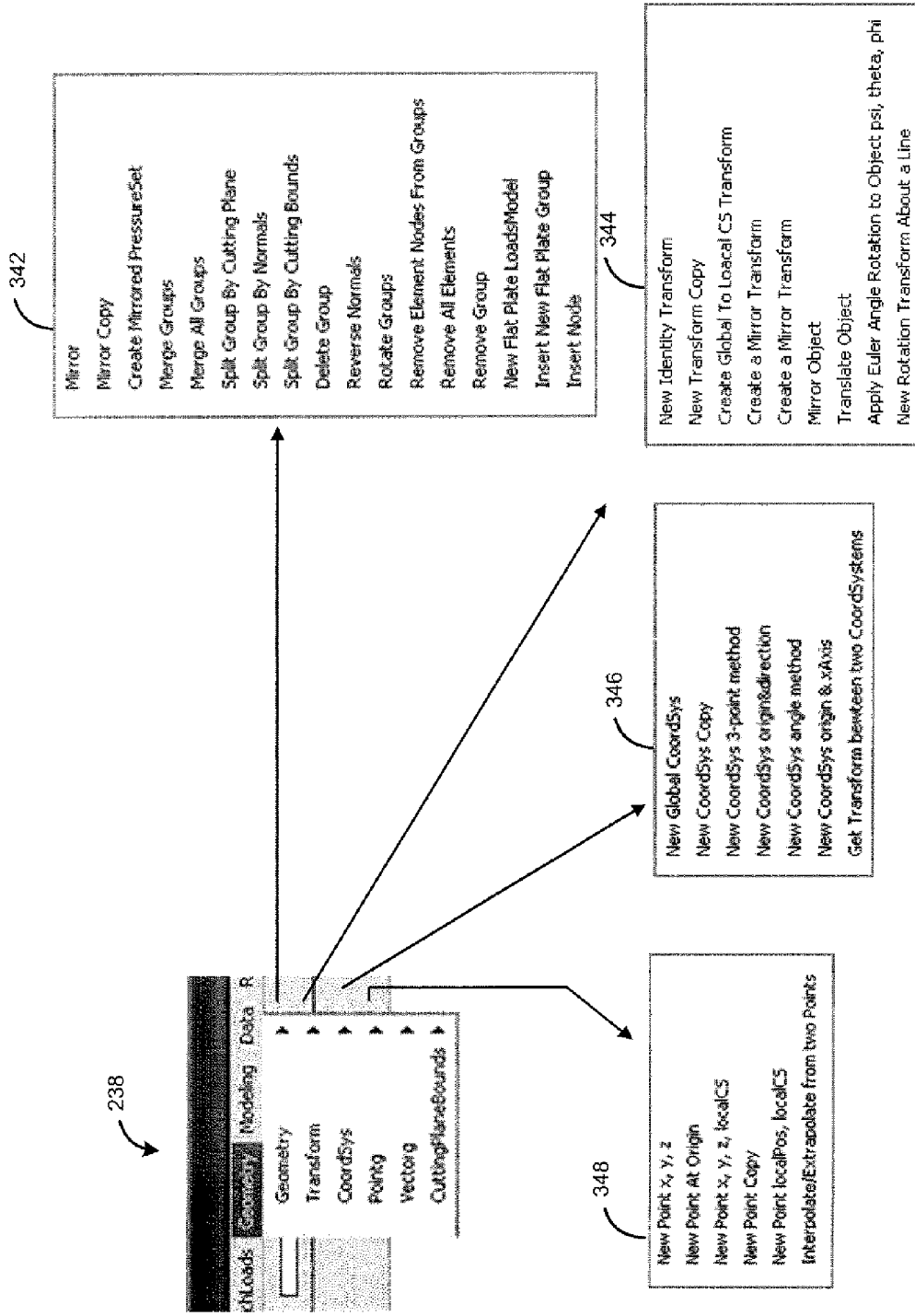
FIGS. 32a-32b are exemplary illustrations of a geometry menu and corresponding sub-menus.
Figure 32B:
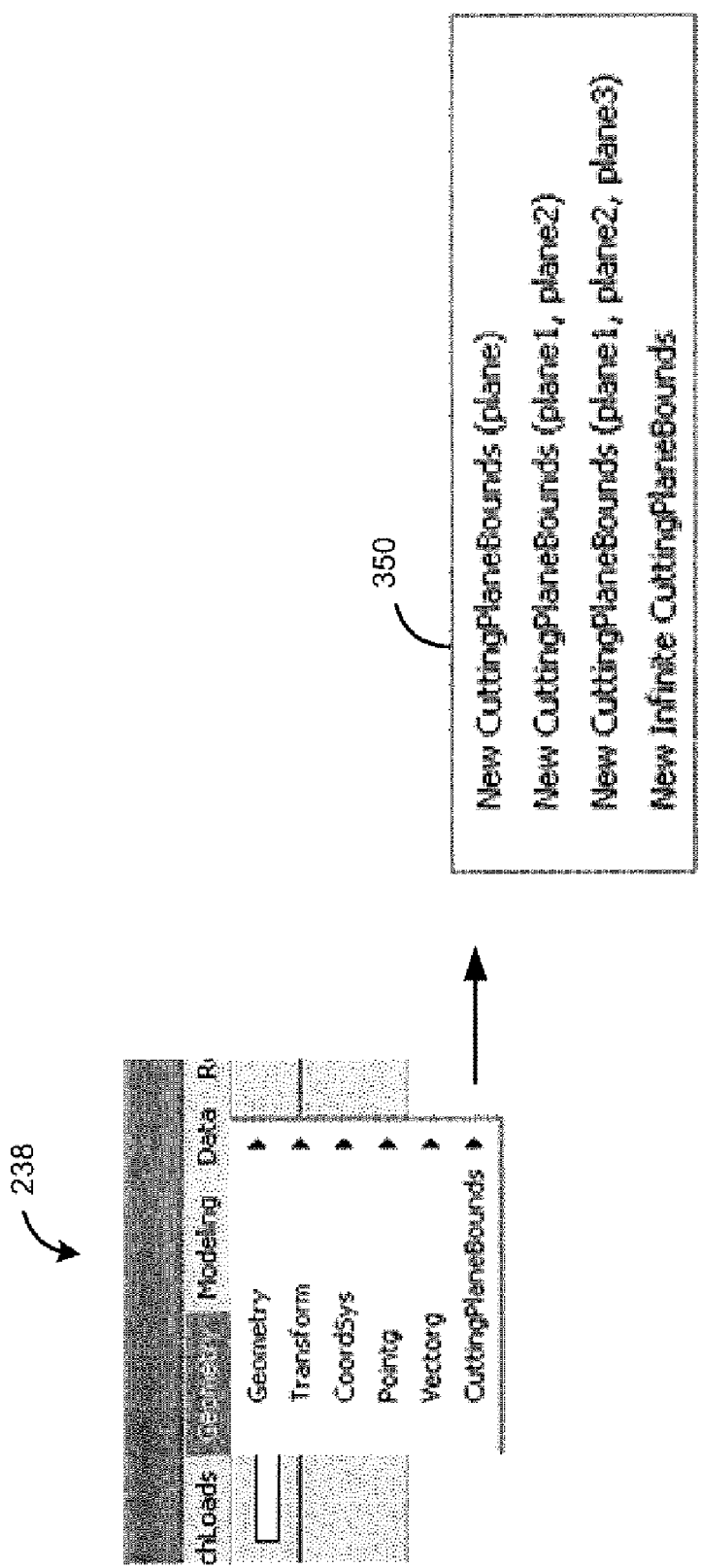

Referring now to FIGS. 32a and 32b, an exemplary geometry menu 238 and corresponding sub-menus 342-350 are shown in more detail. The geometry menu 238 includes geometry operations that can be performed on geometry objects or that can be used to create geometry objects. A geometry sub-menu 342 provides grouping operations that can be performed on existing geometry objects. For example, such grouping operations can include, but are not limited to, merging, splitting, removing, mirroring and transforming operations. A transform sub-menu 344 provides operations to create transform objects and apply geometric transforms to geometry objects. A coordinate system sub-menu 346 provides operations for creating local coordinate systems based on at least one of three methods: a three point method; a position direction method; and an angle method. A point sub-menu 348 provides operations for creating new points in the geometry. A cutting plane bounds sub-menu 350 provides operations for performing more complex grouping operations by cutting planes bounds. A cutting planes bounds object can be created to split the geometry into groups.

Figure 33:
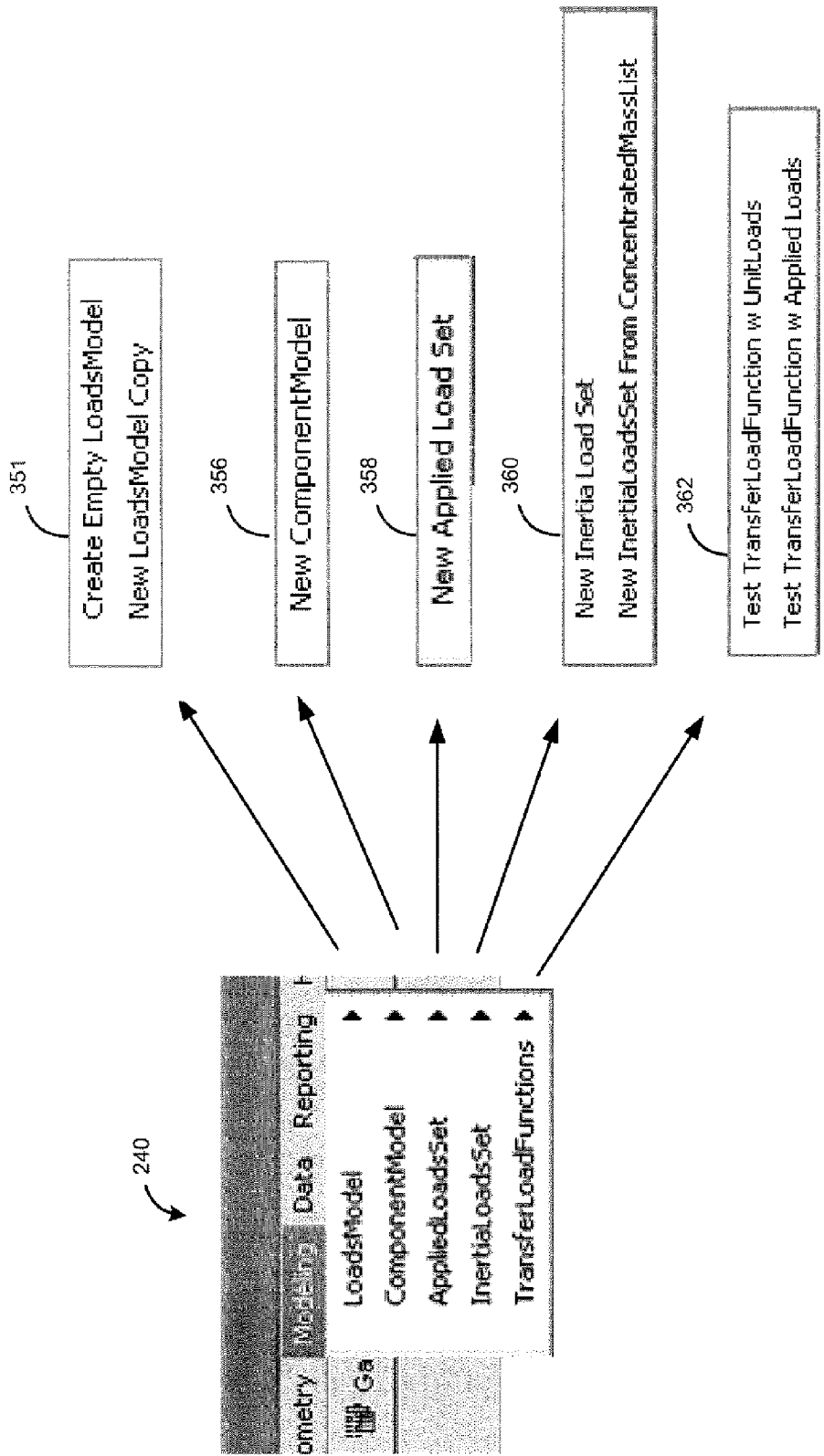
FIG. 33 is an exemplary illustration of a modeling menu and corresponding sub-menus.

Referring now to FIG. 33, an exemplary modeling menu 240 and corresponding sub-menus 354-362 are shown in more detail. The modeling menu 240 includes modeling operations that can be performed on load model objects or that can be used to create load model objects. A loads model sub-menu 354 provides operations for creating load model objects as shown in FIG. 13a. A component model sub-menu 356 provides operations for creating component model objects as shown in FIG. 13b. An applied load set sub-menu 358 provides operations for creating applied load set objects as shown in FIG. 13c. An inertial load set sub-menu 360 provides operations for creating an inertial load set object as shown in FIG. 13d. A transfer load functions sub-menu 362 provides operations for testing transfer load functions.

Figure 34:
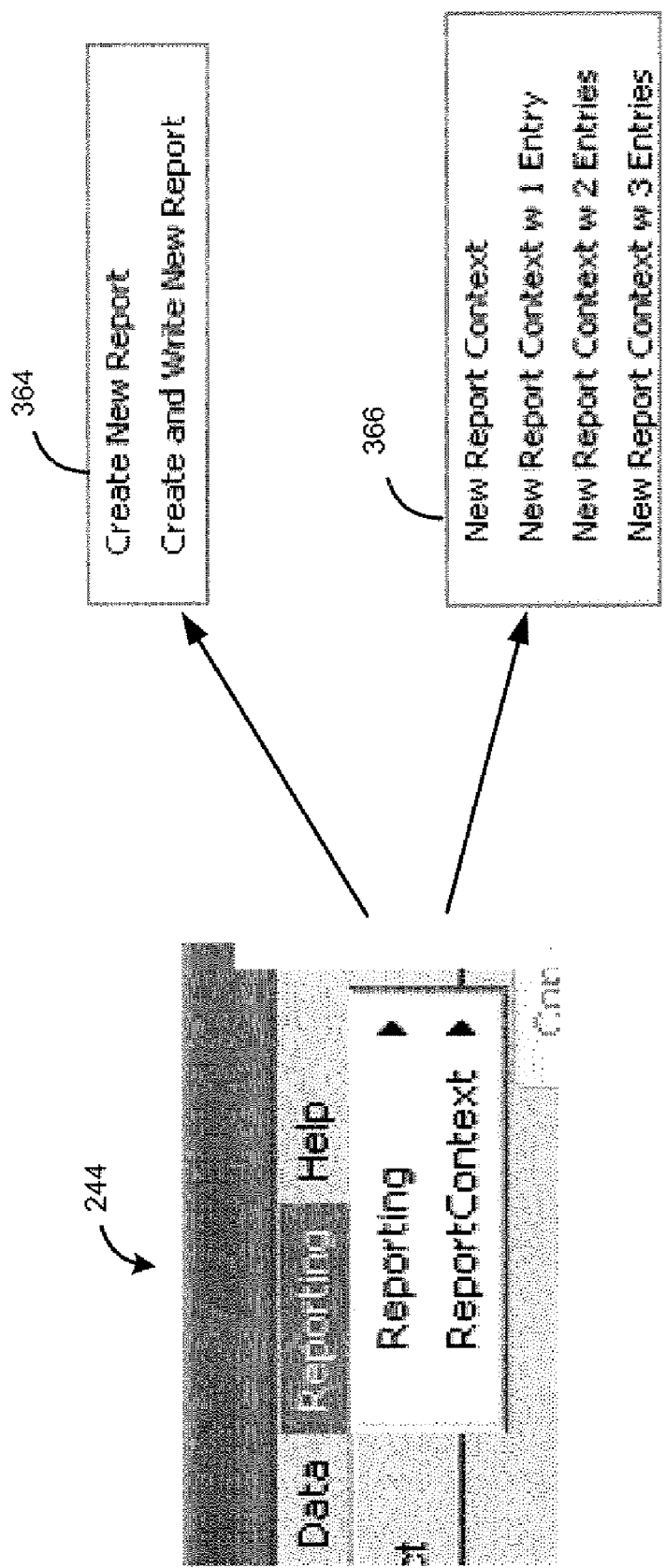
FIG. 34 is an exemplary illustration of a reporting menu and corresponding sub-menus.

Referring now to FIG. 34, an exemplary reporting menu 244 and corresponding sub-menus 354, 366 are shown in more detail. The reporting menu 244 includes reporting operations that can be used to generate reports of the objects and the data. A reporting sub-menu 364 provides operations for creating new reports. Reports are generated by a report engine using a report template specified by the user. A report context sub-menu 366 provides operations for creating report context objects. Report context objects supply the required data (context) to report templates.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications can be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A user interface, including a display screen, for performing load analysis on various geometries of a structure, the user interface comprising:
   an object display module for generating an object display that lists a plurality of load objects that include object data;
   the object display further being partitioned into:
      a first section for displaying a selected load model, a selected component model or a selected applied load object set;
      an adjacent second section for displaying an embedded drop down menu for displaying a plurality of items of information relating to a selection made in the first section;
   a menu display module for controlling the display of a plurality of menu displays, wherein each said menu display lists at least one load analysis operation interface and at least one object creation interface;
   a data display module that generates a script display and a separate data display, the data display displaying the object data associated with the plurality of load objects, and the script display displaying operations relating to a script associated with one of a load operation and an object;

a view configuration display module that displays view properties, based on a user input, in a view configuration display;
the view configuration display being partitioned into a view properties section and a value section:
  the view properties section displaying view properties associated with the information being displayed in the data display, the view properties section including a plurality of a view orientation, a vector scale, a color scale, and lighting, and a foreground color; and
  a value section adjacent the view properties section for displaying a display value for each one of the view properties being displayed in the view properties section;
wherein the plurality of menu displays includes a toolbar for displaying options for selecting a pressure menu, a loads menu, a mass menu, a geometry menu, and a script file menu, that list pressure operations, load operations, mass operations, geometry analysis operations and scripts file editing, respectively, for assisting in analyzing the structure.

2. The user interface of claim 1, wherein the object display lists the plurality of load objects in a tree structure.

3. The user interface of claim 1, wherein the view properties are configurable.

4. The user interface of claim 1, further comprising:
a command line text box that accepts text input; and
an execute selection device that, when selected, executes load operations associated with the text entered in the command line text box.

5. The user interface of claim 1, further comprising a message display that displays load operation messages.

6. The user interface of claim 1, wherein the toolbar displaying the plurality of menu displays includes a matchload menu that lists load match operations.

7. The user interface of claim 1, wherein a subset of menu displays of the plurality of menu displays includes at least one sub-menu.

8. The user interface of claim 1, wherein the plurality of menu displays are associated with the load objects and wherein the object display includes the plurality of menu displays accessible by the corresponding load object.

9. The user interface of claim 4, wherein a second toolbar includes an auto view selection box that is operable to at least one of turn on and turn off the object data from being displayed in the data display.

10. The user interface of claim 9, wherein the second toolbar includes a memory usage meter display that displays the amount of memory being utilized.

11. The user interface of claim 9, wherein the second tool bar includes a directory selection box that is operable to select the directory to which object data is to be retrieved and stored.

12. A system for managing a load analysis user interface that assists a user in analyzing loads experienced by a structure, comprising:

a computer having a processor;
an object display module that generates an object display on a display device; wherein the object display lists a plurality of load objects;
the object display further being partitioned into:
  a first section for displaying a selected load model, a selected component model or a selected applied load object set;
  an adjacent second section for displaying an embedded drop down menu for displaying a plurality of items of information relating to a selection made in the first section;
a menu manager module that generates a plurality of menu displays including at least two of:
  a pressure menu that lists pressure operations;
  a loads menu that lists loads operations; and
  a mass menu that lists mass operations;
a data display module that generates a data display that displays object data associated with the plurality of load objects; and
a view configuration display module that displays view properties associated with object data that is displayed in a view configuration display, the view configuration module including;
  a view configuration display for displaying view properties to a user; and
  a separate script display for displaying contents of a script operation that is being used with a specific load operation;
  the view configuration display being partitioned into:
    a view properties section for displaying view properties associated with the information being displayed in the data display; and
    a value section adjacent the view properties section for displaying a display value for each one of the view properties being displayed in the view properties section; and
wherein the loads menu, when selected, displays options for enabling;
  force options to be carried out for summing forces over an entire load model;
  summing forces for selected groups in the load model;
  clearing forces for a specific load model;
  creating a constant force distribution in a direction of element normals; and
  converting forces to pressures.

13. The system of claim 12, wherein the plurality of menu displays include a matchload menu that lists load match operations.

14. The system of claim 12, wherein the plurality of menu displays are associated with the load objects and wherein the object display includes the plurality of menu displays accessible by the corresponding load object.

* * * * *